US012638403B2

(12) United States Patent
Watanabe et al.

(10) Patent No.: US 12,638,403 B2
(45) Date of Patent: May 26, 2026

(54) IMAGING DEVICE, INSPECTION DEVICE, AND IMAGING METHOD

(71) Applicants: KABUSHIKI KAISHA N-TECH, Gifu-ken (JP); KABUSHIKI KAISHA YAKULT HONSHA, Tokyo (JP); TOHOSHOJI KABUSHIKI KAISHA, Osaka (JP)

(72) Inventors: Tohru Watanabe, Gifu-ken (JP); Yu Yoshida, Tokyo (JP); Kunimitsu Toyoshima, Osaka (JP)

(73) Assignees: KABUSHIKI KAISHA N-TECH, Gifu-ken (JP); KABUSHIKI KAISHA YAKULT HONSHA, Tokyo (JP); TOHOSHOJI KABUSHIKI KAISHA, Osaka (JP)

( * ) Notice: Subject to any disclaimer, the term of this patent is extended or adjusted under 35 U.S.C. 154(b) by 63 days.

(21) Appl. No.: 18/713,444

(22) PCT Filed: Nov. 28, 2022

(86) PCT No.: PCT/JP2022/043763
§ 371 (c)(1),
(2) Date: May 24, 2024

(87) PCT Pub. No.: WO2023/100805
PCT Pub. Date: Jun. 8, 2023

(65) Prior Publication Data
US 2025/0035561 A1 Jan. 30, 2025

(30) Foreign Application Priority Data
Nov. 30, 2021 (JP) ................................ 2021-194975

(51) Int. Cl.
*G01N 21/90* (2006.01)
*G01N 21/359* (2014.01)

(52) U.S. Cl.
CPC ....... *G01N 21/9036* (2013.01); *G01N 21/909* (2013.01); *G01N 21/359* (2013.01); *G01N 2201/0634* (2013.01)

(58) Field of Classification Search
CPC .............. G01N 21/90; G01N 33/0081; G01N 21/9054; G01N 21/9018; G01N 21/9027;
(Continued)

(56) References Cited

U.S. PATENT DOCUMENTS 3,932,042 A * 1/1976 Faani ...................... B07C 5/126
209/524
5,486,692 A * 1/1996 Baldwin ............ G01N 21/9036
209/526
(Continued)

FOREIGN PATENT DOCUMENTS

CN 207816213 U * 9/2018
DE 102009039254 A1 * 5/2013 ........... G01N 21/909
(Continued)

OTHER PUBLICATIONS

Search Report in International Application No. PCT/JP2022/043763 dated Jan. 24, 2023, 2 pages.

*Primary Examiner* — Michael P Stafira
(74) *Attorney, Agent, or Firm* — MARSHALL, GERSTEIN & BORUN LLP

(57) ABSTRACT

An imaging device includes two cameras capturing transmission images of an article from opposite directions, a first light source emitting light that is transmitted through the article in a first direction, and a second light source emitting light that is transmitted through the article in a second direction. The first camera captures a first image that is a transmission image of the article. The second camera captures a second image that is a transmission image of the article. The first half mirror reflects first transmitted light toward the first camera while the second light source is
(Continued)

turned off, and permits transmission of light traveling from the second light source toward the article. The second half mirror reflects second transmitted light toward the second camera while the first light source is turned off, and also permits transmission of light traveling from the first light source toward the article.

8 Claims, 9 Drawing Sheets

(58) Field of Classification Search
CPC ........... G01N 21/9036; G01N 21/9009; G01N 21/9045; G01N 21/8851; G01N 21/8803; G01N 21/9072; G01N 21/9081; G01N 21/8806; G01N 21/909; G01N 2021/8887; G01N 21/958; G01N 2021/8832; G01N 2021/9063; G01N 21/21; G01N 21/51; G01N 21/93; G01N 21/9508; G01N 2201/102; G01N 21/15; G01N 21/88; G01N 21/952; G01N 2201/062; G01N 2021/151; G01N 2021/845; G01N 21/31; G01N 21/314; G01N 21/64; G01N 21/95; G01N 21/954; G01N 21/95607; G01N 2201/0626; G01N 33/146; G01N 2021/152; G01N 2021/3155; G01N 2021/8411; G01N 2021/8907; G01N 2021/95615; G01N 21/255; G01N 21/272; G01N 21/29; G01N 21/3563; G01N 21/47; G01N 21/896; G01N 21/9515; G01N 2201/0633; G01N 2201/0634; G01N 2201/0636; G01N 2223/076; G01N 23/223; G01N 27/61; G01N 35/04; G01N 1/04; G01N 1/16; G01N 1/26; G01N 13/00; G01N 15/0606; G01N 15/0612; G01N 15/088; G01N 15/1433; G01N 2015/019; G01N 2015/0846; G01N 2015/1486; G01N 2021/0314; G01N 2021/052; G01N 2021/054; G01N 2021/1734; G01N 2021/213; G01N 2021/3166; G01N 2021/3181; G01N 2021/3196; G01N 2021/4707; G01N 2021/4711; G01N 2021/4735; G01N 2021/4778; G01N 2021/559; G01N 2021/8427; G01N 2021/8455; G01N 2021/8809; G01N 2021/8816; G01N 2021/8822; G01N 2021/8825; G01N 2021/8829; G01N 2021/8835; G01N 2021/8838; G01N 2021/8854; G01N 2021/8867; G01N 2021/8874; G01N 2021/8896; G01N 2021/8908; G01N 2021/8928; G01N 2021/8962; G01N 2021/8967; G01N 2035/00524; G01N 2035/00752; G01N 2035/0403; G01N 2035/0406; G01N 2035/0437; G01N 2035/0465; G01N 2035/1025; G01N 21/031; G01N 21/05; G01N 21/211; G01N 21/23; G01N 21/293; G01N 21/35; G01N 21/3554; G01N 21/3577; G01N 21/4738; G01N 21/534; G01N 21/59; G01N 21/6445; G01N 21/65; G01N 21/658; G01N 21/8422; G01N 21/85; G01N 21/8507; G01N 21/89; G01N 21/8901; G01N 21/94; G01N 21/9501; G01N 21/951; G01N 2201/024; G01N 2201/0484; G01N 2201/061; G01N 2201/06126; G01N 2201/06153; G01N 2201/0621; G01N 2201/0635; G01N 2201/0637; G01N 2201/0813; G01N 2201/105; G01N 2291/2695; G01N 23/2251; G01N 27/00; G01N 29/28; G01N 33/02; G01N 33/085; G01N 33/386; G01N 35/00613; G01N 35/00732
See application file for complete search history.

(56) References Cited

U.S. PATENT DOCUMENTS

| | | | |
|---|---|---|---|
| 8,581,977 B2 | 11/2013 | Niedermeier et al. | |
| 8,648,905 B2 * | 2/2014 | Suzuki ................. | G01N 21/958 |
| | | | 348/125 |
| 2002/0171054 A1 | 11/2002 | Yamazaki et al. | |
| 2011/0102783 A1 * | 5/2011 | Wiemer ............. | G01N 21/9018 |
| | | | 356/239.4 |
| 2012/0242826 A1 * | 9/2012 | Holmes ................ | A61B 1/0638 |
| | | | 348/E9.003 |

FOREIGN PATENT DOCUMENTS

| | | | | | |
|---|---|---|---|---|---|
| JP | H11201906 A | * | 7/1999 | ......... | G01N 21/9036 |
| JP | 2001116700 A | * | 4/2001 | | |
| JP | 2002-267613 A | | 9/2002 | | |
| JP | 4227272 B2 | * | 2/2009 | | |
| JP | 2011-089978 A | | 5/2011 | | |
| JP | 2014-157121 A | | 8/2014 | | |
| JP | 2019-105610 A | | 6/2019 | | |
| JP | 2020/106504 A | | 7/2020 | | |
| JP | 2021-145185 A | | 9/2021 | | |
| KR | 101755615 B1 | * | 7/2017 | ........... | G02B 27/106 |
| WO | WO-2013111550 A1 | * | 3/2013 | ......... | H05K 13/0812 |

* cited by examiner

| Imaging | First imaging unit 16 | | | | | Second imaging unit 17 | | | | |
|---|---|---|---|---|---|---|---|---|---|---|
| | First camera 31 | Second camera 32 | First light source 21 | Second light source 22 | Third light source 25 | First camera 33 | Second camera 34 | First light source 23 | Second light source 24 | Third light source 25 |
| First imaging | ON | — | ON | — | ON | — | — | — | — | — |
| Second imaging | — | ON | — | ON | ON | — | — | — | — | — |
| Third imaging | — | — | — | — | — | ON | — | ON | — | ON |
| Fourth imaging | — | — | — | — | — | — | ON | — | ON | ON |

Control portion

Near-infrared image　　　IS1

2-channel pseudo-color image　IS2

IMAGING DEVICE, INSPECTION DEVICE, AND IMAGING METHOD

TECHNICAL FIELD OF THE DISCLOSURE

The present disclosure relates to an imaging device, an inspection device, and an imaging method for capturing images of a subject.

BACKGROUND

Patent Literature 1 and Patent Literature 2, for example, disclose imaging devices for capturing images of a subject from different directions. These imaging devices include multiple (for example, four) cameras that can image the entire circumferential surface of the subject. The imaging device inspects the subject for defects or the like based on the pictures captured by the cameras.

Patent Literature 3 discloses an imaging device including a camera for capturing a transmission image of a subject that has light transmissivity, such as a glass container, by receiving light that is emitted by a light source and transmitted through the subject.

CITATION LIST

Patent Literature

Patent Literature 1: Japanese Laid-Open Patent Publication No. 2014-157121
Patent Literature 2: Japanese Laid-Open Patent Publication No. 2019-105610
Patent Literature 3: Japanese Laid-Open Patent Publication No. 2002-267613

SUMMARY

In some cases, it may be desired to use multiple (e.g., four) cameras to image the entire circumference of a subject with light transmissivity as multiple transmission images obtained using light from light sources transmitted through the subject. For example, when multiple cameras include two cameras located on opposite sides of the subject, the transmission images captured by these two cameras may each include the camera and peripheral equipment, for example, located on the opposite side captured through the subject. As such, a picture captured by each camera may include, in the area of the subject, unnecessary objects other than the subject, and there is a problem where pictures suitable for inspection or other specific processing are difficult to obtain.

Solution to Problem

The means for solving the problems and their advantages are described below.

An imaging device for solving the above problems is an imaging device including two cameras that capture two transmitted images of a subject by receiving light transmitted through the subject from opposite directions, the imaging device including: a first light source that emits light that is transmitted through the subject in a first direction; a second light source that emits light that is transmitted through the subject in a second direction that is opposite to the first direction; a first camera that is one of the two cameras and captures a first image by receiving first transmitted light transmitted through the subject in the first direction; a second camera that is the other of the two cameras and captures a second image by receiving second transmitted light transmitted through the subject in the second direction; a first half mirror that reflects the first transmitted light at an intermediate position on an optical path of the first transmitted light along an optical path toward the first camera while the second light source is turned off, and permits transmission of light traveling from the second light source toward the subject at an intermediate position on an optical path of the light; and a second half mirror that reflects the second transmitted light at an intermediate position on an optical path of the second transmitted light along an optical path toward the second camera while the first light source is turned off, and permits transmission of light traveling from the first light source toward the subject at an intermediate position on an optical path of the light.

The "opposite directions" are not limited to diametrically opposite directions, and may be any directions from opposite sides of the subject toward the subject. When the angle formed by the first and second directions that are diametrically opposite is 180 degrees, the opposite directions may be such that the angle formed by the first and second directions is 130 degrees, 150 degrees, or 170 degrees, for example.

According to this configuration, it is possible to capture two high-quality transmission images obtained from light transmitted through the subject from opposite directions with a reduced likelihood of the surroundings of the subject appearing in the images, for example.

The imaging device may further include a control unit, and the control unit may cause the first light source and the second light source to emit light at different emission times, thus causing the capturing of the first image by the first camera and the capturing of the second image by the second camera to occur at different image capturing times corresponding to the emission times.

According to this configuration, it is possible to avoid a situation where the quality of the captured picture is degraded by light from another light source.

The imaging device may include M image capturing units (where M is a natural number greater than or equal to 2) each including the first light source, the second light source, the first camera, the second camera, the first half mirror, and the second half mirror, and the M image capturing units may be arranged such that first optical axes from the subject to the first half mirrors are at mutually different angles when the image capturing units capture images with the first cameras, and the M image capturing units may be configured to image the subject from 2M different directions.

According to this configuration, the subject can be imaged from 2M (M≥2) different directions. Since 2M is greater than or equal to 4, any position around the entire circumference of the subject can be reliably imaged.

The imaging device may further include a third light source capable of applying light to the subject, the first camera may capture a third image by receiving light that has been applied to the subject from the third light source, reflected on a surface of the subject, and then reflected on the first half mirror, and the second camera may capture a fourth image by receiving light that has been applied to the subject from the third light source, reflected on a surface of the subject, and then reflected on the second half mirror.

According to this configuration, a picture of the surface of the subject can be obtained in addition to a picture transmitted through the subject.

In the imaging device, the first light source and the second light source may each include a light emitting diffusion panel, the first half mirror may be bonded to the light emission diffusion panel of the second light source, and the second half mirror may be bonded to the light emission diffusion panel of the first light source.

According to this configuration, when the first light source and the second light source emit light, the first half mirror and the second half mirror cannot be used as mirrors, but can be used as light sources. When the first and second light sources are turned off, the first and second half mirrors can be used as mirrors. When the light source and the mirror function do not have to be used simultaneously, the light source and the half mirror can be integrated, increasing the degree of flexibility in the shape and installation of the light source with the half mirror function.

In the imaging device, the first light source and the second light source may be configured to emit near-infrared light, and the third light source may be configured to emit visible light, the first half mirror may include a visible light blocking member that is configured to limit transmission of visible light and disposed on a side of the first half mirror on which the second light source is located, and the second half mirror may include a visible light blocking member that is configured to limit transmission of visible light and disposed on a side of the second half mirror on which the first light source is located.

According to this configuration, while the visible light reflected on the subject is reflected on the light reflection surface of the half mirror, the visible light blocking member blocks the visible light directed from the light source toward the half mirror. This allows for a reflection image of the subject to be captured with high quality based on the visible light.

In the imaging device, the first light source and the second light source may be configured to emit near-infrared light, and the first camera and the second camera may be N-band color cameras (where N is a natural number greater than or equal to 3) including image sensors having sensitivity to a visible light region and a near-infrared region. The imaging device may include optical bandpass filters each disposed on an optical path between the image sensor of each of the first camera and the second camera and the subject. The imaging device may include a conversion unit that, when receiving an image capturing signal from one of the first and second cameras, separates the image capturing signal into picture signals of N bands and perform a matrix operation on the separated picture signals of N bands to generate a first picture signal of P bands (where P is a natural number less than N) having spectral sensitivity to a near-infrared region, and a second picture signal of Q bands (where Q=N–P) having spectral sensitivity to a visible light region. The conversion unit may, when receiving the image capturing signal from the first camera, generate the first picture signal including the first image and the second picture signal including the third image based on the image capturing signal, and when receiving the image capturing signal the second camera, generate the first picture signal including the second image and the second picture signal including the fourth image based on the image capturing signal.

According to this configuration, a near-infrared transmission picture and a visible light reflection picture of the subject can be captured in one image capturing operation, and a near-infrared transmission imager and a visible light reflection imager of the subject can be obtained from one image capturing signal obtained in the single image capturing operation.

An inspection device includes the above imaging device and an inspection processing unit that inspects the subject based on multiple pictures captured by the first camera and the second camera of the imaging device.

According to this configuration, the subject can be inspected with high accuracy using the multiple transmission pictures obtained from light transmitted through the subject in opposite directions.

An imaging method is an imaging method for capturing images of the subject using the above imaging device, the method including: a first image capturing step in which the first camera captures the first image of the subject by causing the first light source to emit light while the second light source is turned off, a second image capturing step in which the second camera captures the second image of the subject by causing the second light source to emit light while the first light source is turned off, a first picture obtainment step of obtaining a first picture including the first image based on the image capturing signal obtained from the first camera; and a second picture obtainment step of obtaining a second picture including the second image based on the image capturing signal obtained from the second camera.

According to this method, the same advantageous effects as the imaging device according to claim 1 are obtained.

Advantageous Effects of Invention

According to this disclosure, it is possible, for example, to capture two high-quality transmission images obtained from light transmitted through the subject from opposite directions with a reduced likelihood of the surroundings of the subject appearing in the images.

BRIEF DESCRIPTION OF DRAWINGS

FIG. 2 is a schematic side view showing the imaging device.

DETAILED DESCRIPTION

Figure 1:
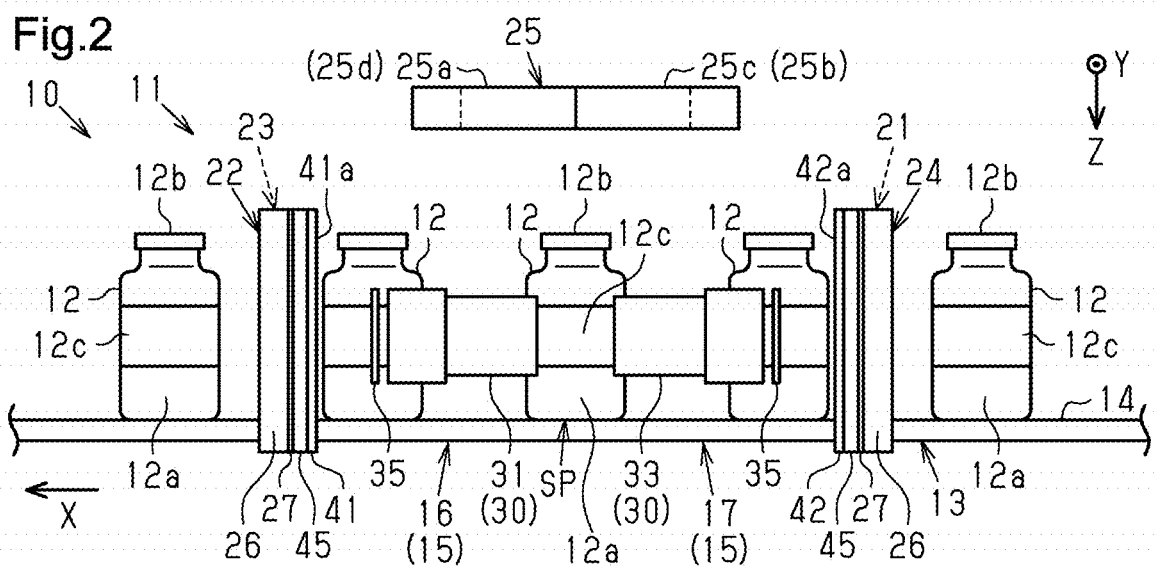
FIG. 1 is a schematic plan view showing an imaging device of one embodiment.

Referring to the drawings, an imaging device and an inspection device are now described.

The present embodiment is described using an example in which an imaging device that captures images of a subject is used to inspect the subject. The imaging device is first described, followed by the inspection device using this imaging device.

Imaging Device

As shown in FIG. 1, an imaging device 11 includes a transport device 13, which transports articles 12 as examples of subjects, and image capturing units 15, which capture images of the transported articles 12.

As shown in FIG. 1, the imaging device 11 includes the transport device 13, which transports articles 12, and one or more image capturing units 15 each including one set of (two) cameras 30, which capture images of the transported articles 12. M image capturing units 15 (where M is a natural number) are provided. When there are M image capturing units 15, 2M cameras 30 are provided. The 2M cameras 30 capture images of the article 12 at an image capturing position SP from 2M different directions.

FIG. 1 shows an example in which M=2, and two image capturing units 15 and four cameras 30 are provided. The four cameras 30 capture images of the article 12 from four different directions. M, which is the number of image capturing units 15, may also be M=1 or M=3, or may be greater than or equal to 4.

As shown in FIG. 1, the transport device 13 may include a conveyor 14, which transports articles 12. The conveyor 14 transports articles 12 in a transport direction X at substantially constant or irregular intervals. For example, the conveyor 14 may be a belt conveyor, a roller conveyor, or the like that conveys the articles 12 placed thereon. Alternatively, the conveyor 14 may transport articles 12 that are gripped by or suspended from the conveyor 14. Furthermore, in an example in which the imaging device 11 is used for inspection, the transport device 13 may include a removal device, which removes from the conveyor 14 the articles 12 that are determined to be defective based on the inspection results. The removal device may be configured to remove an article 12 by pushing it or blowing it away with air force. It may also include a robot that places articles 12 at the image capturing position SP one by one, instead of the conveyor 14. Furthermore, articles 12 may be placed at the image capturing position SP by an operator. In the present example, articles 12 are containers. Each article 12 has a container body 12a and a lid 12b. For example, a label 12c is attached to the outer circumference surface of the container body 12a. A direction perpendicular to the transport direction X is referred to as a width direction Y, and a direction perpendicular to both the transport direction X and the width direction Y is referred to as a vertical direction Z.

The 2M (e.g., four) cameras 30 capture images of the article 12 at the image capturing position SP from 2M different directions (e.g., four directions) along the circumferential direction. A picture of the entire circumference of the article 12 is obtained by means of 2M (e.g., four) pictures captured by the 2M cameras 30. Then, based on the 2M (e.g., four) pictures captured by the imaging device 11, an inspection processing unit 70 (see FIG. 3), which will be described below, inspects the entire circumference of the article 12. In this respect, the imaging device 11 and the inspection processing unit 70 form an inspection device 10 for inspecting articles 12.

The two cameras 30 of one image capturing unit 15 receive transmitted light transmitted through the article 12 from opposite directions, and capture two transmission images of the article 12. The M image capturing units 15 basically have the same configuration. The 2M cameras 30 in total of the M image capturing units 15 receive transmitted light transmitted through the article 12 from 2M directions (e.g., four directions) to capture 2M transmission images. To this end, the M image capturing units 15 are laid out to be symmetric across the vertical plane passing through the image capturing position SP in plan view of FIG. 1, for example, to allow the 2M cameras 30 in total to capture images of the article 12 from 2M directions.

In the example of M=2 shown in FIG. 1, the two image capturing units 15 include a first image capturing unit 16 and a second image capturing unit 17. When the image capturing units 16 and 17 are not distinguished, they are simply referred to as image capturing units 15. When M≥3, the imaging device 11 includes a first image capturing unit 16, a second image capturing unit 17, . . . , and an M-th image capturing unit as the M image capturing units 15.

At least a part of the article 12 has a light transmissivity that allows light to be transmitted through the part. The light transmissivity herein refers to the property of transmitting light to an extent that allows the camera 30 to receive light transmitted through the article 12 and capture an image of at least a part of the article 12 or at least a part of an object accompanying the article 12. The accompanying object includes an inspection target, such as foreign matter present in the article 12. The light is not limited to visible light, and may also be non-visible light, such as near-infrared light, other infrared light, ultraviolet light, or other electromagnetic waves, for example. The light transmittance a (%) of the article 12 may be greater than 5% and less than 100%, for example. Of course, it may be $0<\alpha<5$ as long as the camera 30 can capture images of the subject. Examples of the material of the article 12 include plastic, glass (amorphous), and polycrystalline or single crystal ceramic. Also, the article 12 may be made of wood, such as a thin plate that transmits light, or made of a metal, provided that the light used has a sufficiently shorter wavelength than ultraviolet light, such as electromagnetic waves.

In this embodiment, the article 12 is exemplified by a container having light transmissivity. At least a part of the container is made of a light-transmitting material. The container is at least partially transparent or translucent to light. The transparent material may be colorless or colored. The translucent material has a lower light transmittance a than transparent, and includes translucent white, for example. The container may be made of plastic or glass.

The camera 30 captures a transmission image of the article 12 by receiving the light transmitted through the part of the article 12 that has light transmissivity. In the following description, the two cameras 30 of the first image capturing unit 16 are referred to as a first camera 31 and a second camera 32. The two cameras 30 of the second image capturing unit 17 are also referred to as a first camera 33 and a second camera 34.

When the camera 30 captures a transmission image of the article 12, the scenery on the opposite side (back side) of the article 12 appears through the transparent or translucent article 12. The scenery includes other devices and equipment installed around the imaging device 11. Also, in this example, in which the entire circumference of the article 12 is inspected, another camera 30 that captures an image of the article 12 from the opposite side of one camera 30 may be captured as part of the scenery. For this reason, the two cameras 30 of this example are placed offset from the transmission optical path, which is the optical path in the direction of the light transmitted through the article 12. The transmitted light beams transmitted through the article 12 are reflected on half mirrors 41 and 42 and thus sent to two cameras 30. The two cameras 30 capture transmission images of the article 12 by receiving the light beams that are transmitted through the article 12 from opposite directions and then reflected on the reflection surfaces 41a and 42a of the half mirrors 41 and 42.

One of the cameras 30 captures a transmission image obtained from the light transmitted through the article 12 in a first direction D1. Another camera 30 placed on the opposite side of the article 12 from this camera 30 captures a transmission image obtained from the light transmitted through the article 12 in a second direction D2, which is the direction opposite to the first direction D1. The half mirrors 41 and 42 are positioned on the respective extension lines of the first direction D1 and the second direction D2 along the optical paths passing through the article 12, and serve as background boards for hiding devices, equipment, and the like behind the article 12 as viewed from the corresponding camera 30.

Configuration of Image Capturing Unit 15

Referring to FIGS. 1 and 2, the configuration of the image capturing unit 15 is now described in detail.

The first image capturing unit 16 (15) includes a first light source 21, a second light source 22, a first camera 31, a second camera 32, a first half mirror 41, and a second half mirror 42. The second image capturing unit 17 (15) includes a first light source 23, a second light source 24, a first camera 33, a second camera 34, a first half mirror 43, and a second half mirror 44.

The first and second image capturing units 16 and 17 basically have the same configuration. As such, the four cameras 31 to 34 basically have the same configuration. Also, the first light sources 21 and 23 and the second light sources 22 and 24 all have basically the same configuration. Furthermore, the first half mirrors 41 and 43 and the second half mirrors 42 and 44 all have basically the same configuration.

The configuration of the image capturing units 15 is described below using the first image capturing unit 16 as an example.

In the first image capturing unit 16, the first camera 31 and the second camera 32 are arranged at two positions opposite to each other with the image capturing position SP interposed in between. The first light source 21, which functions as the light source when the first camera 31 captures an image of the article 12, is arranged at a position on the opposite side of the image capturing position SP from the first camera 31. The second light source 22, which functions as the light source when the second camera 32 captures an image of the article 12, is arranged at a position on the opposite side of the image capturing position SP from the second camera 32.

The first light source 21 emits light that is transmitted through the article 12 in the first direction D1. The light emitted from the first light source 21 toward the article 12 is also referred to as first emitted light. The first half mirror 41 is positioned on the optical path of first transmitted light TL1 (see FIG. 5), which has been emitted from the first light source 21 and transmitted through the article 12 in the first direction D1. The first half mirror 41 functions to receive the first transmitted light TL1 transmitted through the article 12 and reflect the first transmitted light TL1 in a direction that allows the first transmitted light TL1 to be captured by the first camera 31.

The second light source 22 emits light that is transmitted through the article 12 in the second direction D2 that is opposite to the first direction D1. The light emitted from the second light source 22 toward the article 12 is also referred to as second emitted light. The second half mirror 42 is positioned on the optical path of second transmitted light TL2 (see FIG. 7), which has been emitted from the second light source 22 and transmitted through the article 12 in the second direction D2. The second half mirror 42 functions to receive the second transmitted light TL2 transmitted through the article 12 and reflect the second transmitted light TL2 in a direction that allows the second transmitted light TL2 to be captured by the second camera 32.

In the example shown in FIGS. 1 and 2, the first direction D1 and the second direction D2 are diametrically opposite directions (180 degrees), but the opposite directions as used herein are not necessarily limited to diametrically opposite directions. In this example, four cameras 31 to 34 captures images of the article 12 from four directions. Thus, to capture transmission images of the article 12 from directions that each differ by 90 degrees (360 degrees/4), opposite directions are selected from natural number multiples of 90 degrees. As a result, opposite directions are diametrically opposite (180 degrees). When expressed using the angle θ formed by the first and second directions D1 and D2, the opposite directions may be directions defined by a value within the range of 90<θ<270, for example.

Since the first half mirror 41 is positioned on the optical path of the transmitted light TL emitted from the first light source 21 and transmitted through the article 12 in the first direction D1, the first light source 21 and the first half mirror 41 are diametrically opposed to each other with the article 12 interposed in between. Likewise, since the second half mirror 42 is positioned on the optical path of the transmitted light TL emitted from the second light source 22 and transmitted through the article 12 in the second direction D2, the second light source 22 and the second half mirror 42 are diametrically opposed to each other with the article 12 interposed in between.

As described above, the first direction D1 and the second direction D2 may be any directions defined by a value within the range of 0<θ<270. While satisfying this condition, the first light source 21 and the second half mirror 42 are preferably positioned on the same optical path, and the second light source 22 and the first half mirror 41 are preferably positioned on the same optical path. When this is satisfied, the second light source 22 can serve as a support member for the first half mirror 41, and the first light source 21 can serve as a support member for the second half mirror 42.

For this reason, the first light source 21 and the second half mirror 42 are positioned on the same optical path, and the second light source 22 and the first half mirror 41 are positioned on the same optical path. In the example shown in FIG. 1, for example, the first light source 21 and the second light source 22 are opposed to each other with the article 12 as the subject interposed in between so that the first direction D1 and the second direction D2 are diametrically opposite (θ≈180°), for example, and the first half mirror 41 and the second half mirror 42 are similarly opposed to each other.

The first half mirror 41 is supported by being attached to the surface of the second light source 22, and the second half mirror 42 is supported by being attached to the surface of the first light source 21. That is, the second light source 22 also serves as the support member for the first half mirror 41. Likewise, the first light source 21 also serves as the support member for the second half mirror 42. The first and second directions D1 and D2 being diametrically opposite (180°) is not the condition required for the light sources 21 and 22 to serve as support members for the half mirrors 41 and 42. For example, the range may be 90<θ<270. The angle θ may be set to any appropriate value in the range that allows the set of the first camera 31, the first half mirror 41, and the first light source 21, and the set of the second camera 32, the second half mirror 42, and the second light source 22 to simultaneously satisfy the condition that the entire article 12 reflected on the half mirrors 41 and 42 is in the image capturing area.

The first and second light sources 21 and 22 each include a light emitting unit 26, which emits light, and an emission diffusion panel 27, which covers the surface of the light emitting unit 26. Thus, the first and second light sources 21 and 22 can emit diffused light. When the first camera 31 captures a transmission image of the article 12, the first light source 21 appears in the image as the background on the opposite side of the article 12 along the optical path of the transmitted light TL. The first light source 21 functions as a background board that surface-emits diffused light through the emission diffusion panel 27. Accordingly, even when the first light source 21 behind the article 12 appears through the article 12 in an image captured by the first camera 31, the first light source 21 appears as the background board of a uniform color (light color such as white), allowing the transmission image of the article 12 to be clearly captured. In this respect, the second light source 22 also functions as a background board that surface-emits diffused light when the second camera 32 captures a transmission image of the article 12. Accordingly, the second light source 22 behind the article 12 appears only as the background board of a uniform color in an image of the article 12 captured by the second camera 32, allowing the transmission image of the article 12 to be clearly captured.

If the second light source 22 emits light simultaneously with the first light source 21 when the first camera 31 captures a transmission image of the article 12, the first half mirror 41, which covers the second light source 22, would not function as a mirror. For this reason, when the first camera 31 captures a transmission image of the article 12, the first light source 21 emits light, but the second light source 22 does not emit light. Since the second light source 22 does not emit light, the surface of the first half mirror 41 functions as a reflection surface 41a.

For the same reason, when the second camera 32 captures a transmission image of the article 12, the second light source 22 emits light, but the first light source 21 does not emit light. Since the first light source 21 does not emit light, the surface of the second half mirror 42 functions as a reflection surface 42a.

In this manner, the two cameras 31 and 32 can capture a first image Img1 (see FIG. 5) and a second image Img2 (see FIG. 7) as transmission images of the article 12 at different times by causing the respective first light source 21 and the second light source 22 to emit light at different times. In this example, the first and second light sources 21 and 22 are near-infrared light sources, which emit near-infrared light. Thus, the two cameras 31 and 32 can capture a first image Img1 and a second image Img2, which are transmission images based on near-infrared light transmitted through the article 12 from opposite directions.

As shown in FIG. 1, the imaging device 11 includes a third light source 25, which applies light to the article 12 in order for the 2M (e.g., four) cameras 30 to capture reflection images reflected on the surface of the article 12. For example, the third light source 25 may be a visible light source for emitting visible light. The visible light source may be a white light source, for example. The third light source 25 may be a visible light source that emits light of other colors, such as a red light source, a green light source, or a blue light source.

The third light source 25 is arranged at a position that allows light reflected on the surface of the article 12 to be incident on the 2M cameras 30 that are arranged in the above-described layout shown in FIGS. 1 and 2. In this example, as shown in FIGS. 1 and 2, the third light source 25 has the shape of an annular ring and is located above the image capturing position SP, with the image capturing position SP positioned at the center of the annular ring in plan view shown in FIG. 1. The third light source 25 may be one light source that can simultaneously apply light to the article 12 from four direction, or may be configured to include 2M (e.g., four) light emitting units 25a to 25d so that light can be applied to the article 12 from four directions at different times. In this example, the third light source 25 with the latter configuration is described.

Figures 5, 6:
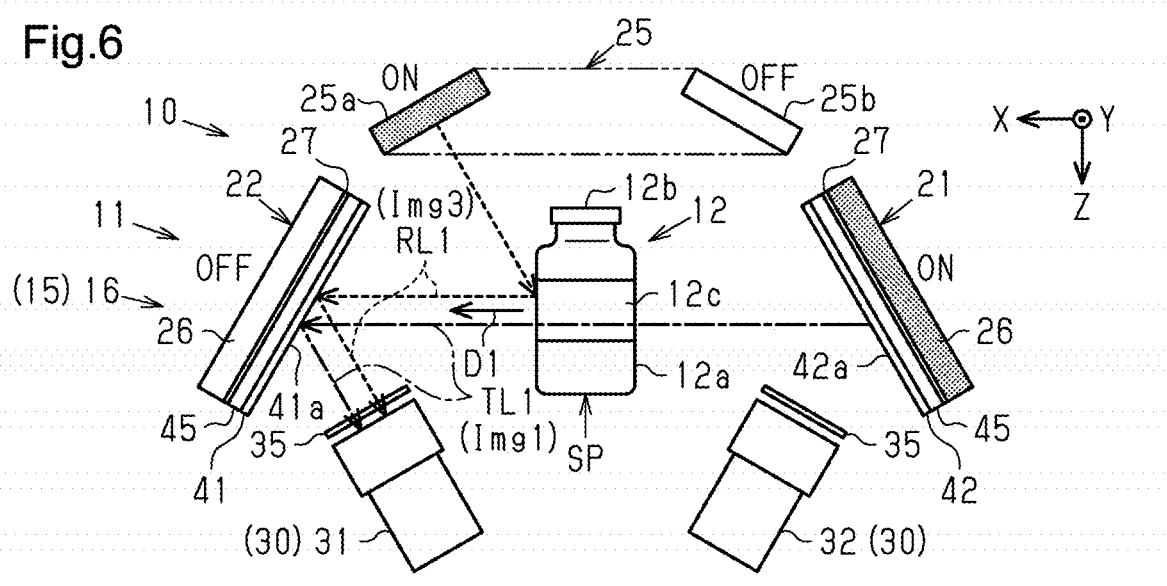
FIG. 5 is a schematic plan view showing the imaging device in a situation where first image capturing is performed.
FIG. 6 is a schematic side view showing the imaging device in a situation where first image capturing is performed.

As shown in FIG. 1, in the present embodiment, the imaging device 11 is configured to capture not only a transmission image (first image Img1) of the article 12 but also a reflection image (third image Img3) of the article 12 (see FIGS. 5 and 6). As shown in FIG. 1, in the example in which M=2, the third light source 25 is configured to apply light to the article 12 from four directions.

In this manner, the two cameras 31 and 32 of the first image capturing unit 16 can simultaneously capture transmission images and reflection images of the article 12 from opposite directions of the article 12. That is, the first camera 31 can simultaneously capture a transmission image Img1 and a reflection image Img3 of the article 12 from one direction.

The first image capturing unit 16 has been described above as an example, and the second image capturing unit 17 also has basically the same configuration as the first image capturing unit 16. The second image capturing unit 17 is arranged at a position offset from the first image capturing unit 16 by 90 degrees, for example, so that the second image capturing unit 17 can capture images of the article 12 from two opposite directions that are different from those of the first image capturing unit 16. Accordingly, the M (e.g., two) cameras 33 and 34 of the second image capturing unit 17 can simultaneously capture transmission images and reflection images of the article 12 from two opposite directions of the article 12.

Thus, the M (e.g., two) cameras 33 and 34 of the second image capturing unit 17 can simultaneously capture transmission images and reflection images of the article 12 from opposite directions of the article 12. That is, the first camera 33 can simultaneously capture a first image Img1, which is a transmission image of the article 12, and a third image Img3, which is a reflection image, from one direction of the article 12. The second camera 34 can simultaneously capture a second image Img2, which is a transmission image of the article 12, and a fourth image Img4, which is a reflection image, from another direction that is opposite to the one direction of the article 12. The half mirrors 43 and 44 of the second image capturing unit 17 have reflection surfaces 43a and 44a.

The components of the image capturing unit 15 described above have the following functions.

The first camera 31 receives first transmitted light transmitted through the article 12 in the first direction D1 to capture a first image Img1.

The second camera 32 receives second transmitted light transmitted through the article 12 in the second direction D2 to capture a second image Img2.

The first half mirror 41 reflects the first transmitted light at an intermediate position on the optical path of the first transmitted light along an optical path toward the first camera 31 while the second light source 22 is turned off, and also permits transmission of light traveling from the second light source 22 toward the article 12 at an intermediate position on the optical path of the light.

The second half mirror 42 reflects the second transmitted light at an intermediate position on the optical path of the second transmitted light along an optical path toward the second camera 32 while the first light source 21 is turned off, and also permits transmission of light traveling from the first light source 21 toward the article 12 at an intermediate position on the optical path of the light.

The imaging device 11 includes M image capturing units 15, each including a first light source 21, a second light source 22, a first camera 31, a second camera 32, a first half mirror 41, and a second half mirror 42. In this example, the number of M is two (M=2). That is, the imaging device 11 includes two (M=2) of each of the first light source 21, the second light source 22, the first half mirror 41, and the second half mirror 42.

The M image capturing units 15 are arranged so as to satisfy the following two conditions.

(a) Condition 1: M pieces (M=2) of each of the first light source 21 and the second light source 22 are arranged at positions and in orientations that allow light emitted from the first light source 21 and the second light source 22 to be transmitted through the article 12 from 2M different directions. In other words, the M image capturing units 15 are arranged such that, when the first cameras 31 of the respective image capturing units 15 capture images, the first optical axes from the article 12 to the first half mirrors 41 are at mutually different angles. In the example shown in FIG. 1, light from the two first light sources 21 and the two second light sources 22 are transmitted through the article 12 from directions that each differ by 90 degrees, which is an angle of 360 degrees/2M, in the circumferential direction of the article 12.

(b) Condition 2: M first cameras 31 and M second cameras 32 are arranged at positions and in orientations that allow the first cameras 31 and the second cameras 32 to capture M first images Img1 and M second images Img2 that are reflected from M first half mirrors 41 and M second half mirrors 42. That is, M first cameras 31 are arranged at positions and in orientations that allow them to capture M first images Img1 reflected from the M first half mirrors 41. Also, M second cameras 32 are arranged at positions and in orientations that allow them to capture M second images Img2 reflected from the M second half mirrors 42.

The second half mirror 42 is arranged so as to hide the first light source 21 within the field of view of the first camera 31. The first half mirror 41 is arranged so as to hide the second light source 22 within the field of view of the second camera 32.

In this manner, the imaging device 11 uses a total of four cameras 31 to 34 of the two image capturing units 16 to capture four near-infrared light transmission images based on the near-infrared light transmitted through the article 12 from four directions, each differing by 90 degrees in the circumferential direction.

Light from the third light source 25 is reflected on the surface of the article 12, reflected on the first half mirror 41, and then received by the first camera 31. The first camera 31 thus captures a third image Img3 as a reflection image.

Also, visible light from the third light source 25 is reflected on the surface of the article 12, reflected on the second half mirror 42, and then received by the second camera 32. The second camera 32 thus captures a fourth image Img4 as a reflection image.

In the example shown in FIG. 1, the third images Img3 captured by M (two) first cameras 31 are M (two) reflection images with which the directions of light applied to the article 12 differ by 90 degrees, for example, in the circumferential direction in plan view.

Likewise, in the example shown in FIG. 1, the fourth images Img4 captured by M (two) second cameras 32 are M (two) reflection images with which the directions of light applied to the article 12 differ by 90 degrees, for example, in the circumferential direction in plan view.

Half Mirror Configuration

The first and second half mirrors 41 and 42 each include a visible light blocking member 45, which limits transmission of visible light. The first half mirror 41 is bonded to the emission diffusion panel 27 of the second light source 22. The second half mirror 42 is bonded to the emission diffusion panel 27 of the first light source 21. The visible light blocking members 45 are provided on the sides of the reflection surfaces of the first half mirror 41 and the second half mirror 42 on which the light sources are located. The visible light blocking members 45 are arranged between the light reflection surfaces of the respective half mirrors 41 and 42 and the emission diffusion panels 27. Thus, the visible light blocking member 45 limits transmission of visible light, such as external light from the light source, to the light reflection surface. Accordingly, the visible light blocking member 45 can limit the merging of visible light, such as external light, into the visible light that has been emitted from the third light source 25 and reflected on the article 12.

Configuration of Inspection Device 10

Figures 3, 4:
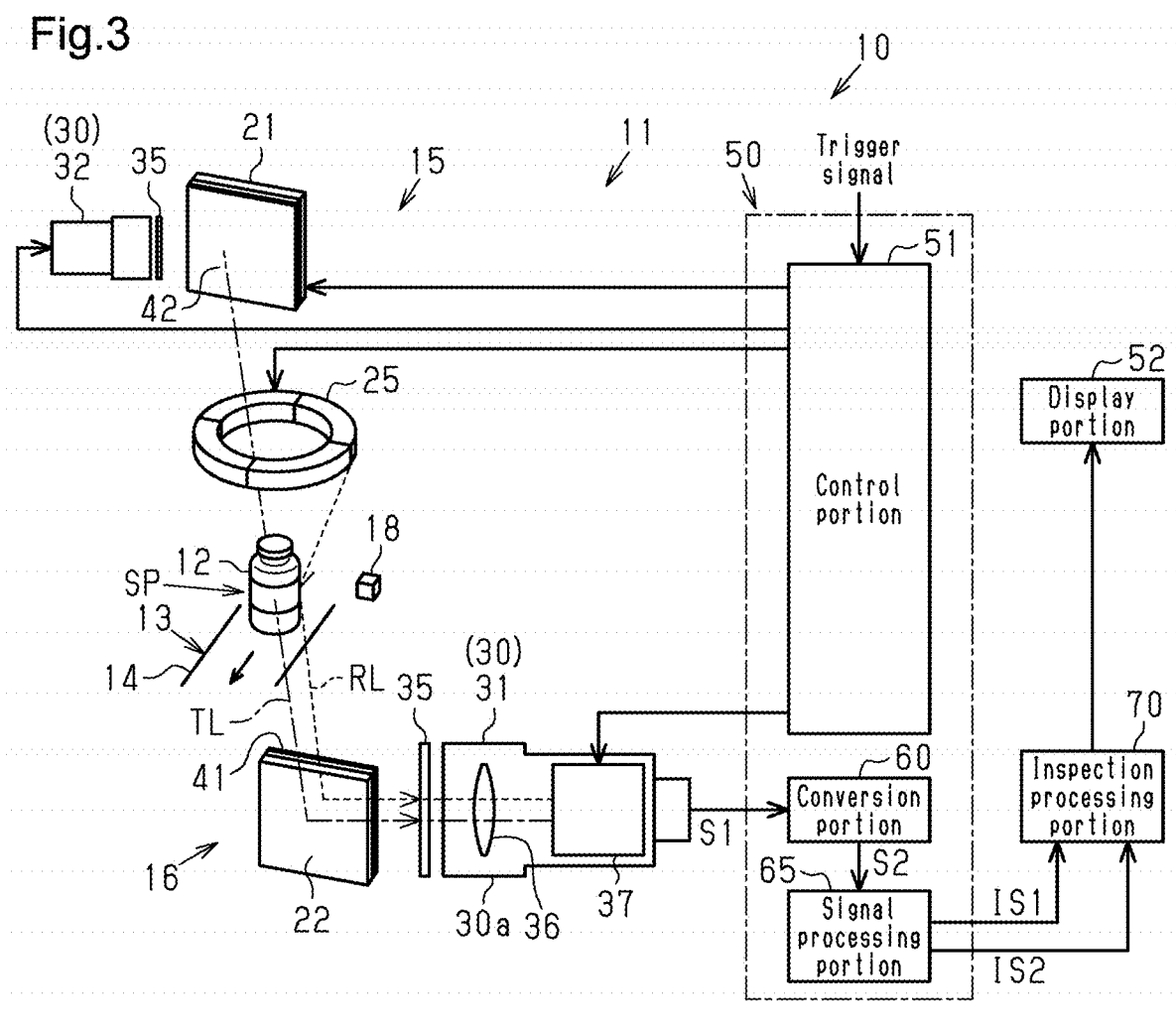
FIG. 3 is a schematic view showing the configuration of an inspection device including the imaging device.
FIG. 4 is a control table showing the control content of image capturing control performed by the control unit of the imaging device.

Referring to FIG. 3, the inspection device 10 including the imaging device 11 is now described. FIG. 3 shows only one of M image capturing units 15 of the imaging device 11.

The inspection device 10 shown in FIG. 3 includes the imaging device 11, which captures images of the article 12, and an inspection processing unit 70, which inspects the quality of articles 12 based on the result of the image capturing performed by the imaging device 11. The inspection device 10 may include a display unit 52, which displays the inspection results of the inspection processing unit 70 and the like.

The imaging device 11 includes M image capturing units 15 (only one is shown in FIG. 3), which capture images of the article 12 transported by the transport device 13 at the image capturing position SP. Each image capturing unit 15 includes a first light source 21, a second light source 22, and a third light source 25, which apply light to the article 12 at the image capturing position SP, and two cameras 30 (31, 32), which capture images of the article 12 at the image capturing position. The imaging device 11 includes a control processing unit 50, which is electrically connected to the light sources 21, 22, and 25 and the two cameras 30 (31, 32). (M–1) sets of light sources 23 and 24 and 2(M–1) cameras 33 and 34 (see FIG. 1) of the other (M–1) image capturing units 15, which are omitted in FIG. 3, are electrically connected to the control processing unit 50 in the same manner as the one image capturing unit 15 shown in FIG. 3.

The control processing unit 50 includes a control unit 51, which controls 2M light sources 21 to 24, one light source 25, and 2M cameras 30, a conversion unit 60 and a signal processing unit 65, which process image capturing signals S1 output by the 2M cameras 30. The control unit 51 may control the transport device 13. In this case, the control unit 51 controls the 2M light sources 21 to 24, one light source 25, and 2M cameras 30 in accordance with the detection signal from a sensor 18 that detects an article 12 reaching the image capturing position SP.

The control unit 51 causes the first light source 21 and the second light source 22 to emit light at different emission times, and causes capturing of the first image Img1 by the first camera 31 and capturing of the second image Img2 by the second camera 32 to occur at different image capturing times corresponding to the emission times.

As shown in FIG. 3, the camera 30 includes an optical bandpass filter 35, which is placed outside a lens barrel 30*a*, a lens 36 placed inside the lens barrel 30*a*, and a color image sensor 37, which captures images of light transmitted through the lens 36 in color. Through the optical bandpass filter 35, transmitted light TL transmitted through the article 12 and reflected light RL reflected on the surface of the article 12 are incident on the camera 30. These incident light beams pass through the lens 36 and are focused on the color image sensor 37 as images. These images include a first image Img1 and a third image Img3 (see FIGS. 5 and 6), or a second image Img2 and a fourth image Img4 (see FIGS. 7 and 8). The camera 30 outputs an image capturing signal S1 including images captured by the color image sensor 37. The detailed configuration of the camera 30 will be described below.

The conversion unit 60 performs conversion processing to convert the image capturing signal S1 input from the camera 30 into an image capturing signal S2 having a relative sensitivity of a predetermined value or greater to a wavelength range different from that of the image capturing signal S1.

The signal processing unit 65 performs, by performing signal processing on the image capturing signal S2, separation processing to separate the image capturing signal S2 into a first picture signal IS1 including a first image Img1 and a second picture signal IS2 including a third image Img3.

The inspection processing unit 70 inspects the quality of the article 12 based on the two picture signals IS1 and IS2 input from the signal processing unit 65.

The conversion unit 60, the signal processing unit 65, and the inspection processing unit 70 also perform the above processing on the image capturing signal S1 input from the second camera 32 to inspect the quality of regions each corresponding to ¼ of the circumference of the article 12, for example, based on the separated two picture signals IS1 and IS2. For the image capturing signals S1 from the other first and second cameras 33 and 34, the inspection processing unit 70 inspects the quality of regions each corresponding to ¼ of the circumference of the article 12, for example, based on the separated two picture signals IS1 and IS2. The inspection processing unit 70 displays on the display unit 52 the result of the inspection of the entire circumference, which is performed by dividing the circumference of the article 12 into multiple regions, and the inspection image. The control processing unit 50 and the inspection processing unit 70 are configured by a computer, for example. The computer includes an input device and the display unit 52. The display unit 52 is not limited to a monitor, and may be a display provided on an operation panel or the like. Details of the processing content of the conversion unit 60 and the like will be described below.

Content of Control by Control Unit 51

FIG. 4 is control data CD showing the details of control by the control unit 51 in a table. In FIG. 4, "OFF" in ON/OFF control by the control unit 51 is indicated by "-." The control unit 51 controls the imaging device 11 based on the control data CD shown in FIG. 4. That is, the control unit 51 controls each of the first cameras 31 and 33, the second cameras 32 and 34, the first light sources 21 and 23, the second light sources 22 and 24, and the third light source 25 provided in the two image capturing units 16 and 17. Specifically, the control unit 51 controls the image capturing times of a total of four cameras 31 to 34. The control unit 51 controls the emission times of the first to third light sources 21 to 25.

The control unit 51 sequentially images one article 12 M times (e.g., four times) using the M cameras 30 to image the entire circumference of the article 12.

As shown in FIG. 4, to perform first image capturing, which is the image capturing in the first step, the control unit 51 turns on the first camera 31, the first light source 21, and the third light source 25 of the first image capturing unit 16, and turns off all others including the second image capturing unit 17.

To perform second image capturing, which is the image capturing in the second step, the control unit 51 turns on the second camera 32, the second light source 22, and the third light source 25 of the first image capturing unit 16, and turns off all others including the second image capturing unit 17.

To perform third image capturing, which is the image capturing in the third step, the control unit 51 turns on the first camera 33, the first light source 23, and the third light source 25 of the second image capturing unit 17, and turns off all others including the first image capturing unit 16.

To perform fourth image capturing, which is the image capturing in the fourth step, the control unit 51 turns on the second camera 34, the second light source 24, and the third light source 25 of the second image capturing unit 17, and turns off all others including the first image capturing unit 16.

By performing ON/OFF control on the imaging device 11 in this manner, the control unit 51 captures pictures of the entire circumference of the article 12 using the four cameras 31 to 34. Thus, a transmission image of the entire circumference (360 degrees) of the article 12 is obtained by means of the four transmission images captured by the four cameras 31 to 34. Also, a reflection image of the entire circumference (360 degrees) of the article 12 is obtained by means of the four reflection images captured by the four cameras 31 to 34. For example, two of the cameras 31 to 34 of the image capturing units 16 and 17 can capture images at the same time. For example, in FIG. 5, the first camera 31 and the first camera 33 can capture images at the same time. This can be done provided that turning the light sources 22 and 24 both off and turning the light sources 21 and 23 both on will not cause interference between them. In other words, as long as the two cameras 30 belonging to the same image capturing unit 15 are prevented from simultaneously capturing images, multiple cameras 30 can simultaneously capture images. Capturing images simultaneously by a combination of M cameras 30 each selected from the respective M image capturing units 16 allows the articles 12 to be transported at high speed.

Figures 7, 8:
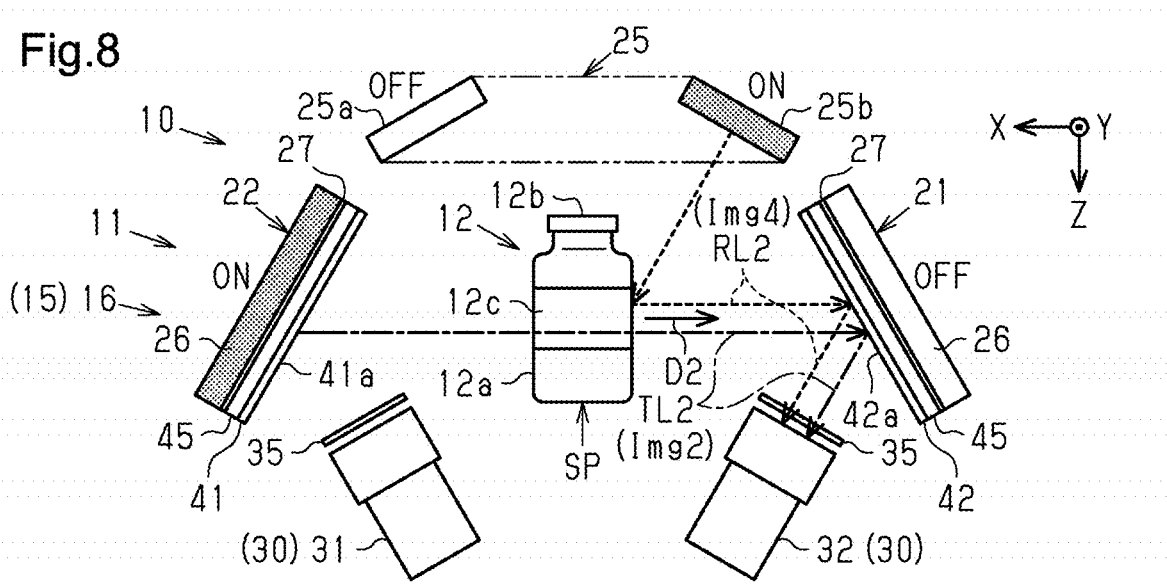
FIG. 7 is a schematic plan view showing the imaging device in a situation where second image capturing is performed.
FIG. 8 is a schematic side view showing the imaging device in a situation where second image capturing is performed.

FIGS. 5 to 8 show ON/OFF control of the light sources 21, 22, and 25 and the cameras 31 and 32 in a situation where one image capturing operation is performed. FIGS. 5 and 6 show a situation where the first camera 31 captures an image of the article 12, and FIGS. 7 and 8 show a situation where the second camera 32 captures an image of the article 12. These are examples in which the first camera 31 and the second camera 32 of the first image capturing unit 16 capture images of the article 12 at different image capturing times. The basic control content is the same for the first and second cameras 33 and 34 of the second image capturing unit 17 capturing images of the article 12 at different image capturing times. In FIGS. 6 and 8, to clarify the optical paths from the light sources 21, 22, and 25 to the cameras 31 and 32, the orientations of the first camera 31 and the second camera 32 are schematically shown tilted from their actual horizontal orientations.

As shown in FIG. 5, the control unit 51 turns on the first light source 21, turns off the second light source 22, and turns on the third light source 25. As a result, as indicated by dot patterns in FIGS. 5 and 6, the first light source 21 and the first light emitting unit 25a of the third light source 25 emit light. At this time, the second light source 22 is in an off state.

Light from the first light source 21 is transmitted through the article 12 in the first direction D1. The transmitted light TL1 transmitted through the article 12 in the first direction D1 is reflected on the first half mirror 41. The first half mirror 41 reflects the transmitted light TL1 (first image Img1) along an optical path leading to the first camera 31. At this time, the second light source 22 is turned off (OFF), so that the first half mirror 41 functions as a mirror. The transmitted light TL1 from the first half mirror 41 passes through the optical bandpass filter 35 and enters the first camera 31. The first camera 31 thus captures a first image Img1 of the article 12.

As shown in FIG. 6, visible light from the third light source 25 is reflected on the surface of the article 12, and the reflected light RL1 is reflected on the first half mirror 41. The first half mirror 41 reflects the reflected light RL1 (third image Img3) along an optical path leading to the first camera 31. The reflected light RL1 from the first half mirror 41 passes through the optical bandpass filter 35 and enters the first camera 31. The first camera 31 thus captures a third image Img3.

In this manner, in a single image capturing operation, the first camera 31 simultaneously captures the first image Img1, which is a near-infrared light image, and the third image Img3, which is a visible light image. The first camera 31 outputs an image capturing signal S1 to the conversion unit 60 (see FIG. 3). Based on the input image capturing signal S1, the conversion unit 60 performs processing to separate the first image Img1 and the third image Img3 from each other.

After this first image capturing, second image capturing is performed. As shown in FIG. 7, the control unit 51 turns off the first light source 21, turns on the second light source 22, and turns on the third light source 25. As a result, as indicated by dot patterns in FIGS. 7 and 8, the second light source 22 and the second light emitting units 25b of the third light source 25 emit light. At this time, the first light source 21 is in an off state.

Light from the second light source 22 is transmitted through the article 12 in the second direction D2. The transmitted light TL2 transmitted through the article 12 in the second direction D2 is reflected on the second half mirror 42. The second half mirror 42 reflects the transmitted light TL2 (second image Img2) along an optical path leading to the second camera 32. At this time, the first light source 21 is turned off (OFF), so that the second half mirror 42 functions as a mirror. The transmitted light TL2 from the second half mirror 42 passes through the optical bandpass filter 35 and enters the second camera 32. The second camera 32 thus captures a second image Img2 of the article 12.

As shown in FIG. 8, visible light from the third light source 25 is reflected on the surface of the article 12, and the reflected light RL2 is reflected on the second half mirror 42. The second half mirror 42 reflects the reflected light RL2 (fourth image Img4) along an optical path leading to the second camera 32. The reflected light RL2 from the second half mirror 42 passes through the optical bandpass filter 35 and enters the second camera 32. The second camera 32 thus captures a fourth image Img4.

In this manner, in a single image capturing operation, the second camera 32 simultaneously captures the second image Img2, which is a near-infrared light image, and the fourth image Img4, which is a visible light image. The second camera 32 outputs an image capturing signal S1 to the conversion unit 60 (see FIG. 3). Based on the input image capturing signal S1, the conversion unit 60 performs processing to separate the second image Img2 and the fourth image Img4 from each other.

Configuration of Camera 30

Figure 9:
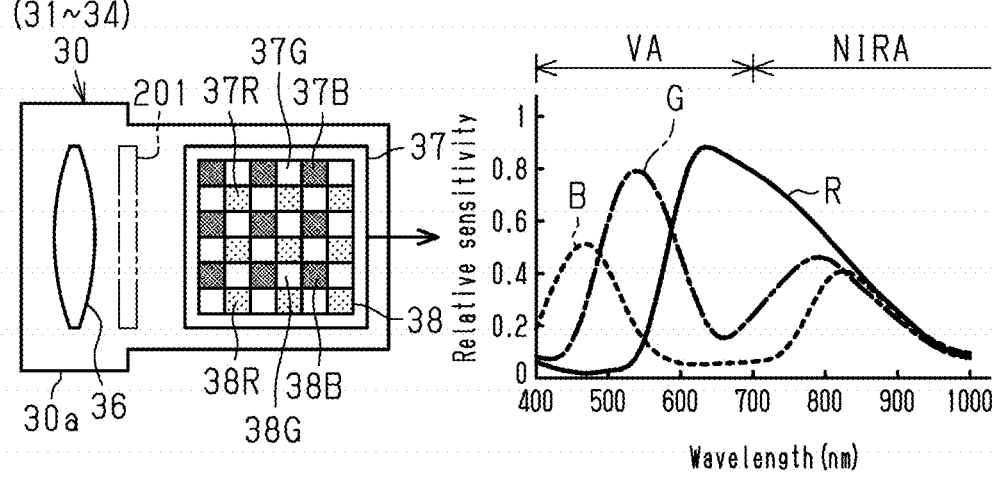
FIG. 9 is a configuration diagram of a camera in an example, and a graph showing the relationship between incident wavelength and relative sensitivity of an image sensor.

Referring to FIG. 9, the configuration and the image capturing characteristics of the camera 30 are now described. The camera 30 shown in FIG. 9 is based on a general-purpose color camera, which captures RGB images, for example. A general-purpose camera includes a lens 36 attached to a lens barrel 30a, a near-infrared light blocking filter 201 for blocking near-infrared light (hereinafter also referred to as an IR blocking filter 201), and an image sensor 37. The camera 30 of the present embodiment is configured by removing the IR blocking filter 201 indicated by the dashed double-dotted line in FIG. 9 from a general-purpose color camera.

The removal of the IR blocking filter 201 allows the image sensor 37 in the camera 30 to have RGB image capturing characteristics including the wavelength band of near-infrared light. R light receiving elements 37R, G light receiving elements 37G, and B light receiving elements 37B are sensitive to light in the visible light wavelength range VA and the near-infrared wavelength range NIRA shown in the graph in the right side of FIG. 9.

The image sensor 37 includes R light receiving elements 37R, G light receiving elements 37G, and B light receiving elements 37B. Each R light receiving element 37R receives red light transmitted through an R filter 38R, and outputs an R image capturing signal corresponding to the amount of received light. Each G light receiving element 37G receives green light transmitted through a G filter 38G, and outputs a G image capturing signal corresponding to the amount of received light. Each B light receiving element 37B receives blue light transmitted through a B filter 38B and outputs a B image capturing signal corresponding to the amount of received light. In the image sensor 37, the R light receiving elements 37R, the G light receiving elements 37G, and the B light receiving elements 37B are arranged in a predetermined array.

The R light receiving elements 37R, the G light receiving elements 37G, and the B light receiving elements 37B are sensitive to light of the respective wavelength bands shown in the graph in the right side of FIG. 9. In this graph, the horizontal axis indicates wavelength, and the vertical axis indicates relative sensitivity. The image sensor 37 has the RGB image capturing characteristics that have a sensitivity of a predetermined value or greater even to the wavelength band of near-infrared light. The camera 30 is not limited to a configuration based on a general-purpose color camera.

The color filter 38 of the image sensor 37 may be a complementary color filter of Mg, Ye, and Cy instead of the RGB primary color filter. Also, in addition to the RGB filter or the complementary color filter, an NIR filter that selectively transmits near-infrared light may also be used. The RGB filter may be a combination of R, G1, G2, and B filters, and the color filter 38 may be a combination of a complementary color filter and a primary color filter. Furthermore, three or more types of filters may be combined.

Figure 10:
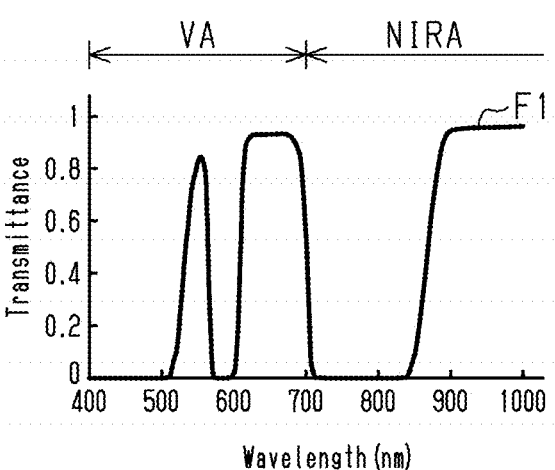
FIG. 10 is a graph showing the light transmittance characteristics of an optical bandpass filter.

The optical bandpass filter 35 has the optical characteristics shown in FIG. 10, for example. The optical bandpass filter 35 has the spectral transmittance characteristics of having one or more blocking ranges in the visible light wavelength range VA and one or more transmitting ranges in the near-infrared wavelength range NIRA. The near-infrared wavelength range NIRA has a wavelength of about 800 to about 2500 nm. The optical bandpass filter 35 has the spectral transmittance characteristics of having blocking ranges with a transmittance of 0.1 or less in multiple wavelength bands, and having transmitting ranges with a transmittance of 0.7 or greater in multiple wavelength bands. In other words, the optical bandpass filter 35 has the spectral transmittance characteristics of having one or more blocking ranges in the visible light wavelength range VA and having a transmitting range in the near-infrared wavelength range NIRA.

Figure 11:
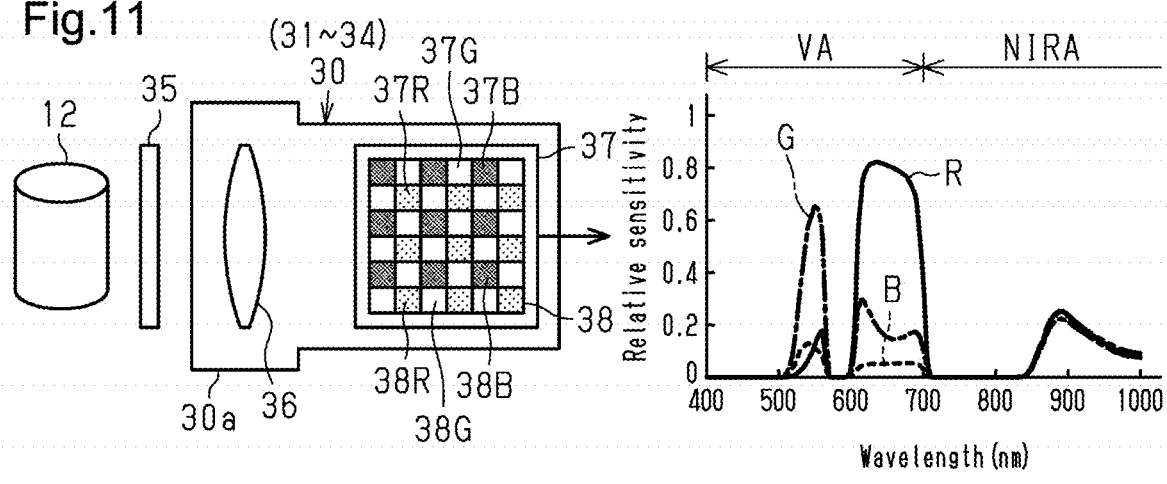
FIG. 11 is a graph showing the relative sensitivity of the image sensor to each color through an optical bandpass filter.

The optical bandpass filter 35 shown in FIG. 11 is includes one or more optical bandpass filters.

Thus, although the image sensor 37 itself has relative sensitivity to the three bands of RGB as shown in FIG. 9, the spectral transmittance characteristics of the optical bandpass filter 35 shown in FIG. 11 cause the image sensor 37 to substantially have relative sensitivity shown in the graph of FIG. 11.

Optical Bandpass Filter 35

The R light receiving elements 37R of the image sensor 37 shown in FIG. 9 have sensitivity to the band indicated by R in the graph of FIG. 9, the G light receiving elements 37G have sensitivity to the band indicated by G, and the B light receiving elements 37B have sensitivity to the band indicated by B. Of the light transmitted through the optical bandpass filter 35, the light receiving elements 37R, 37G, and 37B receive the light transmitted through the filters 38R, 38G, and 38B of the color filter 38 according to their respective sensitivities. The image sensor 37 outputs a first image capturing signal S1, in which image capturing signals representing an R value, a G value, and a B value corresponding to the amounts of light received by the light receiving elements 37R, 37G, and 37B are serially arranged in the order of a predetermined array pattern.

Figure 12:
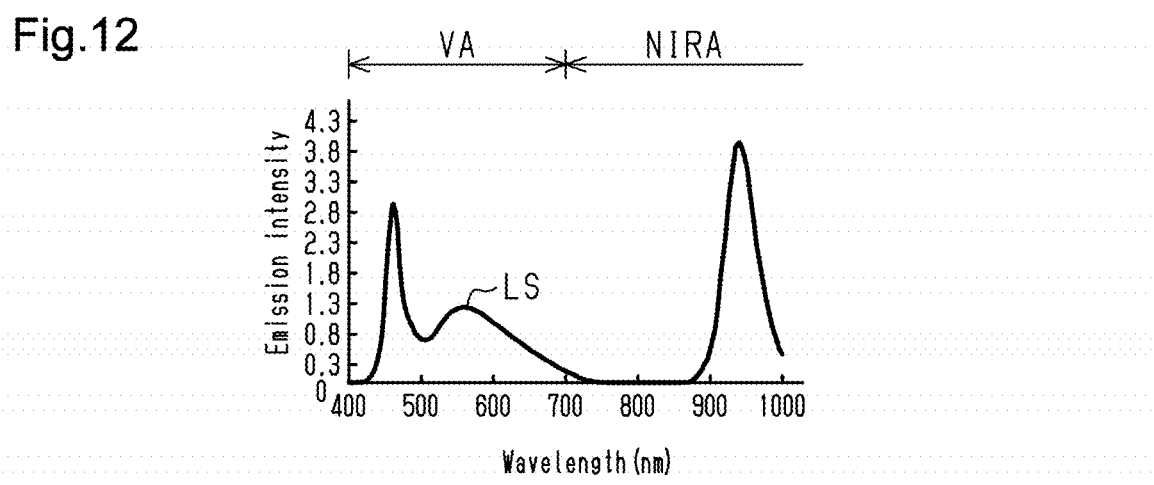
FIG. 12 is a graph showing the combined emission spectrum of a near-infrared light source, which is a first light source or a second light source, and a visible light source, which is a third light source.

FIG. 12 shows the emission spectrum of a combination of the first light source 21 or the second light source 22, which is a near-infrared light source, and the third light source 25, which is a white light source. A case will now be described in which light having an emission spectrum of the combination of a near-infrared light source and a white light source enters the image sensor 37. As the result of the combination of the light emission intensity characteristics shown in FIG. 12 and the relative sensitivity characteristics of the first image capturing signal S1 shown in FIG. 11, the image sensor 37 outputs RGB signals of three bands shown in the graph of FIG. 13A as the first image capturing signal S1.

Figures 13A, 13B:
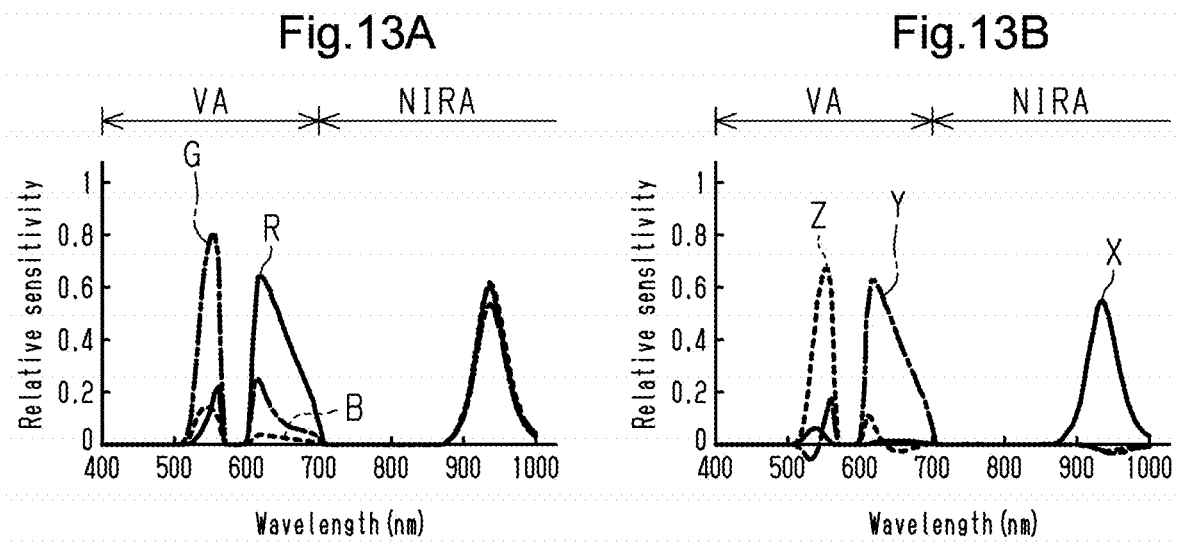
FIG. 13A is a graph showing the relative sensitivity of the image sensor to each color in a situation where a visible light source and a near-infrared light source are used as light sources.
FIG. 13B is a graph showing the relative sensitivity of each band of a second image capturing signal obtained by performing matrix operation on a first image capturing signal of colors of the image sensor.

The conversion unit 60 shown in FIG. 3 converts the RGB values of the first image capturing signal S1 input from the image sensor 37 shown in FIG. 9 into XYZ values to generate a second image capturing signal S2. That is, the conversion unit 60 converts RGB picture signals of three bands shown in the graph of FIG. 13A into XYZ picture signals of three bands (FIG. 13B) having sensitivities to wavelength bands different from those of the RGB picture signals. The graph of FIG. 13B shows the XYZ picture signals of three bands represented by XYZ values, which form the second image capturing signal S2. The horizontal axis of the graph indicates wavelength, and the vertical axis indicates relative sensitivity.

As shown in FIG. 13B, the peak of one of the three bands of the XYZ picture signals forming the second image capturing signal S2 is in the near-infrared wavelength range NIRA. The peaks of the other two bands are in the visible wavelength range VA. Each band of XYZ is separated.

When the image capturing signal S1 is input from one of the first and second cameras 31 and 32, the conversion unit 60 separates the image capturing signal S1 into RGB picture signals of N bands, and performs a matrix operation on the separated RGB picture signals of N bands. The conversion unit 60 thus generates XYZ picture signals of N bands. In the example shown in FIG. 13B, one band of the X picture signal is in the near-infrared wavelength range NIRA, and two bands of the Y picture signal and the Z picture signal are in the visible light wavelength range VA. As such, the conversion unit 60 generates a first picture signal MS1, which includes the X picture signal of one band having spectral sensitivity to the near-infrared region, and a second picture signal MS2, which includes YZ picture signals of two bands having spectral sensitivities to the visible light region. In generalization, the conversion unit 60 generates a first picture signal MS1 of P bands (where P is a natural number less than N) having spectral sensitivity to the near-infrared region and a second picture signal MS2 of Q bands (where Q=N–P) having spectral sensitivity to the visible light region (see FIG. 14).

The first image Img1 and the second image Img2 are near-infrared light transmission images. The third image Img3 and the fourth image Img4 are reflection images of visible light. The first picture signal MS1 having spectral sensitivity to the near-infrared region is a picture signal including the first image Img1 or the second image Img2. The second picture signal MS2 having spectral sensitivity to the visible light region is a picture signal including the third image Img3 or the fourth image Img4. The conversion unit 60 generates a first picture signal MS1 including a first image Img1 and a second picture signal MS2 including a third image Img3 based on the image capturing signal S1 input from the first camera 31, 33. The conversion unit 60 generates a first picture signal MS1 including a second image Img2 and a second picture signal MS2 including a fourth image Img4 based on the image capturing signal S1 input from the second camera 32, 34. In this manner, the conversion unit 60 outputs the image capturing signal S2 including the first picture signal MS1 of P bands and the second picture signal MS2 of Q bands.

Configuration of Conversion Unit 60 and Inspection Processing Unit 70

Figure 14:
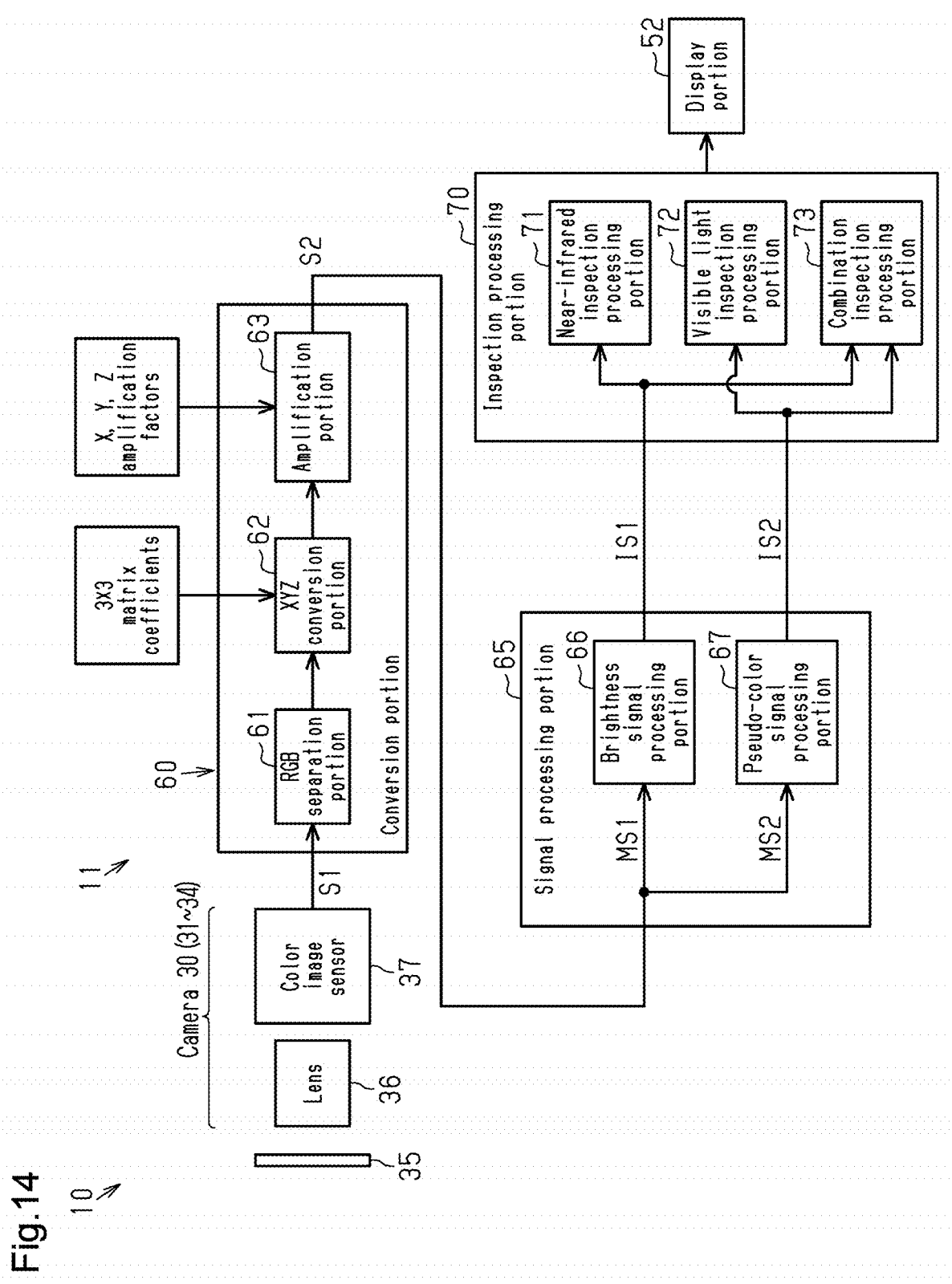
FIG. 14 is a block diagram showing the functional configuration of an inspection device.

Referring to FIG. 14, the configurations of the conversion unit 60 and the inspection processing unit 70 are now described in detail.

As shown in FIG. 14, images of the article 12 are formed on the image capturing surface of the image sensor 37 through the optical bandpass filter 35 and the lens 36. The image sensor 37 outputs a first image capturing signal S1 to the conversion unit 60 as the image capturing result of the article 12. The first image capturing signal S1 is a serial signal including an R image capturing signal (red signal), a G image capturing signal (green signal), and a B image capturing signal (blue signal) from the light receiving elements 37R, 37G, and 37B. The R image capturing signal, the G image capturing signal, and the B image capturing signal are also simply referred to as R signal, G signal, and B signal.

As shown in FIG. 14, the conversion unit 60 includes an RGB separation unit 61, an XYZ conversion unit 62, and an amplification unit 63. The RGB separation unit 61 separates the first image capturing signal S1 input from the image sensor 37 into an R image capturing signal, a G image capturing signal, and a B image capturing signal.

The XYZ conversion unit 62 converts the R signal, G signal, and B signal input from the RGB separation unit 61 into an X signal, a Y signal, and a Z signal. Specifically, the XYZ conversion unit 62 generates the X signal, the Y signal, and the Z signal by performing a matrix operation on the RGB values, which are the signal values of the R signal, the G signal, and the B signal. The XYZ conversion unit 62 is given matrix coefficients. The matrix used for the matrix operation is a 3×3 matrix. Coefficients in a 3×3 matrix are given to the XYZ conversion unit 62.

The XYZ conversion unit 62 performs a matrix operation in which the RGB values of the first image capturing signal S1 are multiplied by a 3×3 matrix specified by matrix coefficients, thereby generating the second image capturing signal S2, which is represented by XYZ and has spectral characteristics different from RGB of the first image capturing signal S1. The matrix coefficients are coefficients for splitting the RGB of the first image capturing signal S1 into the multiple bands of XYZ of the second image capturing signal S2.

The calculation formula for converting the RGB signals, which form the first image capturing signal S1, into the XYZ signals, which form the second image capturing signal S2, is given by the following expression (1).

$$\begin{pmatrix} X \\ Y \\ Z \end{pmatrix} = \begin{pmatrix} a1 & a2 & a3 \\ b1 & b2 & b3 \\ c1 & c2 & c3 \end{pmatrix} \times \begin{pmatrix} Gx \\ Gy \\ Gz \end{pmatrix} \times \begin{pmatrix} R \\ G \\ B \end{pmatrix} \qquad (1)$$

In this expression, a1 to a3, b1 to b3, and c1 to c3 are matrix coefficients, and Gx, Gy, and Gz are amplification factors.

The XYZ conversion unit 62 performs the arithmetic processing of multiplying the RGB values by the 3×3 matrix as the above expression (1). The XYZ conversion unit 62 outputs to the amplification unit 63 the XYZ value before being multiplied by the amplification factors.

When the number of colors of the color filter 38 of the image sensor 37 is n (where n is a natural number greater than 2), the matrix operation performed on n image capturing signals is an m×n matrix operation (where m is a natural number greater than 1). The m×n matrix includes matrix coefficients that are set to separate the image capturing signals for the respective colors in the first image capturing signal S1 into wavelength ranges of n bands. In this example, the image capturing signals for the respective colors in the first image capturing signal S1 are the R signal, the G signal, and the B signal, and the number of colors n is 3 (n=3). The second image capturing signal S2 has the X signal, the Y signal, and the Z signal of three bands, and m=3. That is, the m×n matrix is a 3×3 matrix. The 3×3 matrix has matrix coefficients that are set to enhance the separation of the three bands.

For example, when the optical bandpass filter 35 having the transmission characteristics shown in FIG. 10 is used, the following 3×3 matrix coefficients are given for the matrix operation for the conversion from FIG. 13A to FIG. 13B. That is, as the coefficients of the 3×3 matrix, a1=0, a2=−0.13, a3=1, b1=1, b2=0.1, b3=−1.15, c1=−0.2, c2=1, and c3=−0.7 are given.

Also, an m×n matrix operation (where m≠n) may be used. When the number greater than 2, the operation is not limited to the 3×3 matrix operation, and a 3×4 matrix operation may be performed to generate multispectral pictures of four bands, or a 3×2 matrix operation may be performed to generate multispectral pictures with a smaller number of bands than the number of colors n.

The amplification unit 63 multiplies the XYZ values from the XYZ conversion unit 62 by the given X amplification factor Gx, the Y amplification factor Gy, and the Z amplification factor Gz, respectively. The amplification unit 63 multiplies the X value after XYZ conversion by the X amplification factor Gx, multiplies the Y value by the Y amplification factor Gy, and multiplies the Z value by the Z amplification factor Gz. That is, the amplification unit 63 normalizes the XYZ bands by performing an operation of multiplying the 1×3 matrix using the amplification factors Gx, Gy, and Gz as matrix coefficients in the above expression (1). The amplification unit 63 outputs the normalized XYZ values as an image capturing signal S2. The normalization process may fix one signal level and adjust the other two signal levels. For example, the Y signal may be fixed, and the X and Z signals may be adjusted.

In this manner, the conversion unit 60 sequentially performs RGB separation processing, XYZ conversion processing, and normalization processing on the input first image capturing signal S1, thereby outputting the second image capturing signal S2. In other words, the conversion unit 60 converts the first image capturing signal S1 into the second image capturing signal S2. The first image capturing signal S1 is an RGB picture signal of N bands. The second image capturing signal S2 is an XYZ picture signal of N bands. That is, the conversion unit 60 converts the N-band RGB picture signal into the N-band XYZ picture signal. In this manner, the conversion unit 60 generates N-band multispectral pictures. As described above, in the case of three bands, the XYZ picture signal includes the first picture signal MS1 including the X picture signal of one band, and the second picture signal MS2 including the YZ picture signals of two bands. The conversion unit 60 outputs an image capturing signal S2, which is generated from the first image capturing signal S1 and includes a first picture signal MS1 of P bands (where P is a natural number less than N) having spectral sensitivity to the visible light region, and a second picture signal MS2 of Q bands (where Q=N−P) having spectral sensitivity to the near-infrared region.

When the second image capturing signal S2, which is an N-band XYZ picture signal, is input, the signal processing unit 65 processes the second image capturing signal S2 separately as a first picture signal MS1 of P bands and a second picture signal MS2 of Q bands (where Q is Q=N−P). When the second image capturing signal S2 has three bands, the signal processing unit 65 processes the second image capturing signal S2 separately as a first picture signal MS1 of one band and a second picture signal MS2 of two bands, for example. The first picture signal MS1 of one band is a near-infrared picture signal, and the second picture signal MS2 of two bands is a visible light picture signal.

The signal processing unit 65 includes a brightness signal processing unit 66, which adjusts the brightness value of the first picture signal MS1 of P bands to generate a first picture signal IS1, and a pseudo-color picture signal processing unit 67, which converts the second picture signal MS2 of Q bands into a second picture signal IS2, which is a pseudo-color picture signal. The brightness signal processing unit 66 outputs the first picture signal IS1 to the inspection processing unit 70. The pseudo-color picture signal processing unit 67 outputs the second picture signal IS2 to the inspection processing unit 70. The brightness signal processing unit 66 may adjust the brightness by performing non-linear processing such as gamma correction, or perform edge enhancement processing and the like, if necessary.

Figure 15A:
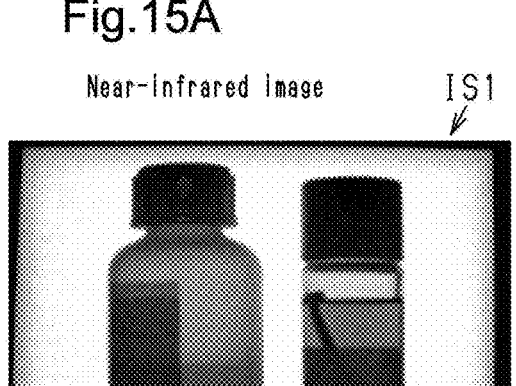
FIG. 15A is a diagram showing a near-infrared picture.

The first picture signal IS1 shown in FIG. 14 is a signal of a transmission picture of near-infrared light transmitted through the article 12. The display unit 52 displays the first picture based on the first picture signal IS1 as a transmission picture of the article 12 as shown in FIG. 15A. This allows for inspection of the content of the container and the liquid within the container for foreign matter. Also, the second picture signal IS2 shown in FIG. 14 is a signal of a two-channel pseudo-color picture. As such, the display unit 52 (see FIG. 3) displays the second picture based on the second picture signal IS2 in two-channel pseudo-colors. By looking at the second picture on the display unit 52, the inspector can visually check for any defects or the like from a difference in color, facilitating the inspection of the article 12. In the present embodiment, the picture based on the first picture signal IS1 is also referred to as a first picture IS1, and the picture based on the second picture signal IS2 is also referred to as a second picture IS2.

Figure 15B:
FIG. 15B is a diagram showing a two-channel pseudo-color picture.

For example, FIG. 15A shows a first picture IS1 that is a near-infrared picture, and FIG. 15B shows a second picture IS2 that is a two-channel pseudo-color picture. The first picture IS1 shown in FIG. 15A is a near-infrared transmission picture of the article 12, and a defect such as foreign matter in the dark liquid in the container as the article 12 is relatively clearly captured. Also, the second picture IS2 shown in FIG. 15B is a visible light reflection picture expressed as a two-channel pseudo-color picture of the article 12, and the surface of the label attached to the outer circumference surface of the article 12 is clearly captured.
Inspection Processing Unit The inspection processing unit 70 shown in FIG. 14 is now described.

The inspection processing unit 70 inspects the article 12, which is the subject, based on a first picture signal IS1 of P bands having spectral sensitivity to the near-infrared region and a second picture signal IS2 of Q bands having spectral sensitivity to the visible light region, which are output by the imaging device 11.

The inspection processing unit 70 includes a near-infrared inspection processing unit 71, a visible light inspection processing unit 72, and a combination inspection processing unit 73. The first picture signal IS1 is inputted to the near-infrared inspection processing unit 71, the second picture signal IS2 is inputted to the visible light inspection processing unit 72, and the first picture signal IS1 and the second picture signal IS2 are input to the combination inspection processing unit 73. In this example, the first picture signal IS1 and the second picture signal IS2 input to the combination inspection processing unit 73 are a near-infrared picture signal of one band and a visible light picture signal of two bands.

The near-infrared inspection processing unit 71 inspects the article 12 based on the first picture signal IS1, which is a near-infrared picture. The visible light inspection processing unit 72 inspects the article 12 based on the second picture signal IS2, which is a visible light picture. The combination inspection processing unit 73 inspects the article 12 based on both the first picture signal IS1 and the second picture signal IS2, which are a near-infrared light image and a visible light image. For example, the near-infrared inspection processing unit 71 binarizes the first picture signal IS1, which is a brightness picture signal, by determining the upper and lower thresholds of the brightness level, and then determines the quality of the article 12 based on the sizes and the number of inspection target regions extracted as the result of the binarization. The visible light inspection processing unit 72 extracts specific color regions from the second picture signal IS2, which is a pseudo-color picture signal, by specifying a color coordinate area from the pseudo-colors, and determines the quality of the article 12 based on the sizes and the number of the specific color regions. The combination inspection processing unit 73 determines the quality of the article 12 based on the sizes and the number of common regions, which are obtained as the result of an AND operation performed on the threshold region separately extracted from the first picture signal IS1, which is a brightness picture signal, and the specific color region that is separately extracted from the second picture signal IS2, which is a pseudo-color picture signal.

Operation of Embodiment

Operation of the imaging device 11 and the inspection device 10 is now described.

As shown in FIGS. 1 and 3, the conveyor 14 of the transport device 13 transports articles 12, which are subjects. When the sensor 18 (see FIG. 3) detects an article 12, a trigger signal is input to the control unit 51. Upon receiving the trigger signal, the control unit 51 controls the light sources 21 to 25 and the cameras 31 to 34 based on the control data CD shown in FIG. 4.

Visible light reflected on the surface of the article 12 and near-infrared light transmitted through the article 12 pass through an optical bandpass filter 35 and a lens 36 and enter a camera 30. On the image capturing surface of the image sensor 37 in the camera 30, an image of near-infrared light transmitted through the article 12 (first image Img1) and an image of visible light reflected on the surface of the article 12 (third image Img3) are formed. The image sensor 37 captures an image of one frame of the article 12 through the optical bandpass filter 35. The image sensor 37 outputs a first image capturing signal S1 to the conversion unit 60. At this time, the first light source 21 emits light while the second light source 22 is turned off, and the first camera 31 captures a first image Img1 of the article 12. This image capturing process corresponds to an example of the first image capturing step. Then, the second light source 22 emits light while the first light source 21 is turned off, and the second camera 32 captures a second image Img2 of the article 12. This image capturing process corresponds to an example of the second image capturing step.

The conversion unit 60 separates the first image capturing signal S1 into RGB, and multiplies the separated RGB values by a 3×3 matrix to convert the RGB values into XYZ values. By multiplying these XYZ values by amplification factors Gx, Gy, and Gz, normalized XYZ values are generated. In this manner, the conversion unit 60 outputs the second image capturing signal S2 including the multispectral image of three bands. The second image capturing signal S2 is output to the signal processing unit 65. In other words, the conversion unit 60 generates, from the first image capturing signal S1, a first picture signal MS1 of P bands (where P is a natural number less than N) having spectral sensitivity to the near-infrared region, and a second picture signal MS2 of Q bands (where Q=N–P) having spectral sensitivity to the visible light region.

The signal processing unit 65 inputs the N-band (three-band) XYZ pictures forming the second image capturing signal S2 by separating it into P bands and Q bands (where Q=N–P). In an example in which the second image capturing signal S2 has three bands, the first picture signal MS1 of one band is input to the brightness signal processing unit 66, and the second picture signal MS2 of two bands is input to the pseudo-color picture signal processing unit 67. In this example, the first picture signal MS1 is a near-infrared picture signal, and the second picture signal MS2 is a visible light picture signal.

The brightness signal processing unit 66 adjusts the brightness value of the first picture signal MS1 of one band. The pseudo-color picture signal processing unit 67 converts the two-band second picture signal MS2 into a pseudo-color picture signal. As a result, the signal processing unit 65 outputs the first picture signal IS1 and the second picture signal IS2 to the inspection processing unit 70.

The first picture IS1 including the first image Img1 is obtained based on the image capturing signal S1 obtained from the first camera 31 in the first image capturing step. This picture obtainment process corresponds to an example of the first picture obtainment step. The second picture IS2 including the second image Img2 is obtained based on the image capturing signal S1 obtained from the second camera 32 in the second image capturing step. This picture obtainment process corresponds to an example of the second picture obtainment step.

In the inspection processing unit 70, the near-infrared inspection processing unit 71 inspects the article 12 based on the first picture signal IS1, which is a near-infrared picture. Also, the visible light inspection processing unit 72 inspects the article 12 based on the second picture signal IS2, which is a visible light picture. Furthermore, the combination inspection processing unit 73 inspects the article 12 based on both the first and second picture signals IS1 and IS2.

Each of the inspection processing units 71 to 73 determines the quality of the article 12. When the article 12 is defective, the control unit 51 drives a removal device (not shown) to remove the defective article 12 from the conveyor 14.

FIGS. 15A and 15B show examples of picture captured by the imaging device 11. In the example of FIGS. 15A and 15B, the articles in each picture are two containers. The container on the left is a translucent plastic container containing liquid. The container on the right is a transparent glass container containing dark-colored (for example, black) liquid. As shown in FIG. 15A, the first picture signal IS1 is a signal of a transmission picture in which near-infrared light is transmitted through the article 12. The display unit 52 (see FIG. 14) displays the first picture IS1 as a transmission picture of the article 12 as shown in FIG. 15A. This allows for inspection of the content of the container and the liquid within the container for foreign matter. A wire is present in the liquid in the container on the right, and it can be visually perceived in the near-infrared picture shown in FIG. 15A.

As shown in FIG. 15B, the second picture signal IS2 is a signal of a two-channel pseudo-color picture. As such, the display unit 52 displays the second picture IS2 in two-channel pseudo-colors. By looking at the second picture on the display unit 52, the inspector can visually check for any defects or the like from a difference in color, facilitating the inspection of the article 12. In the visible light picture of FIG. 15B, foreign matter such as the wire in the container on the right cannot be visually perceived.

Figure 16:
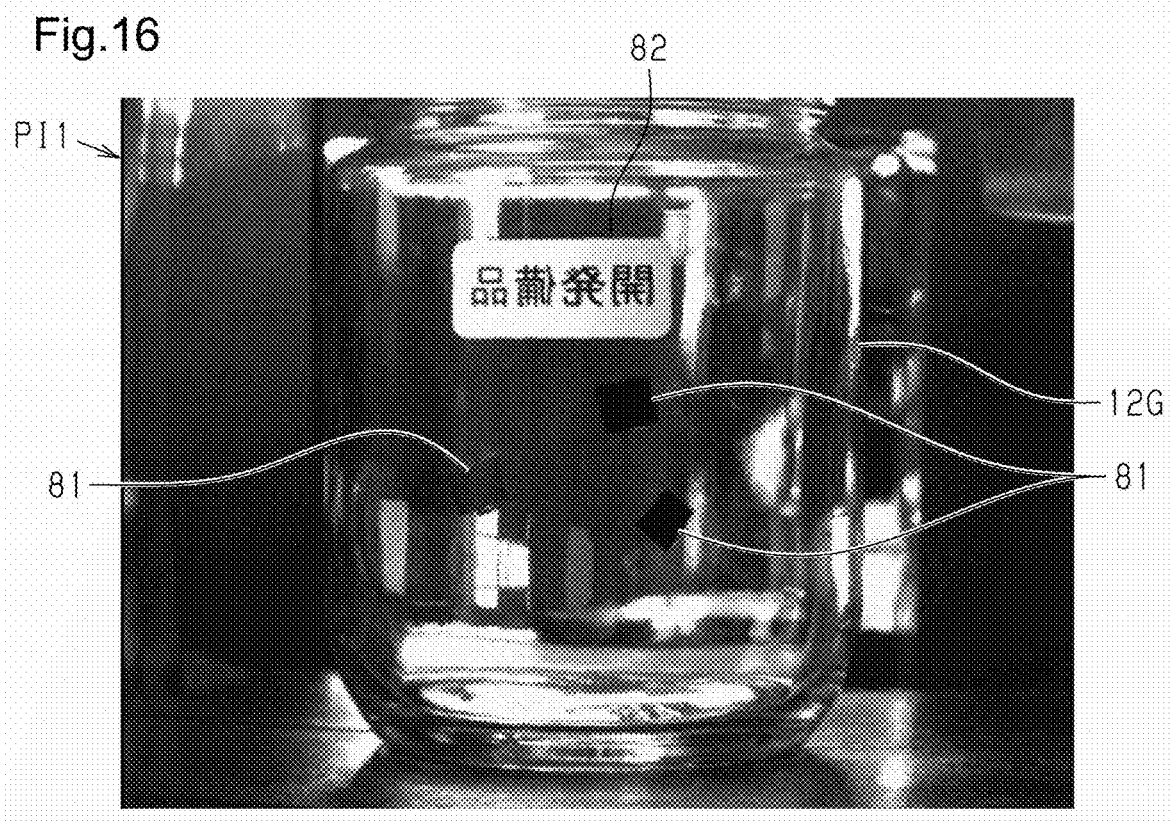
FIG. 16 is a diagram showing a captured picture of a comparative example.
Figure 17:
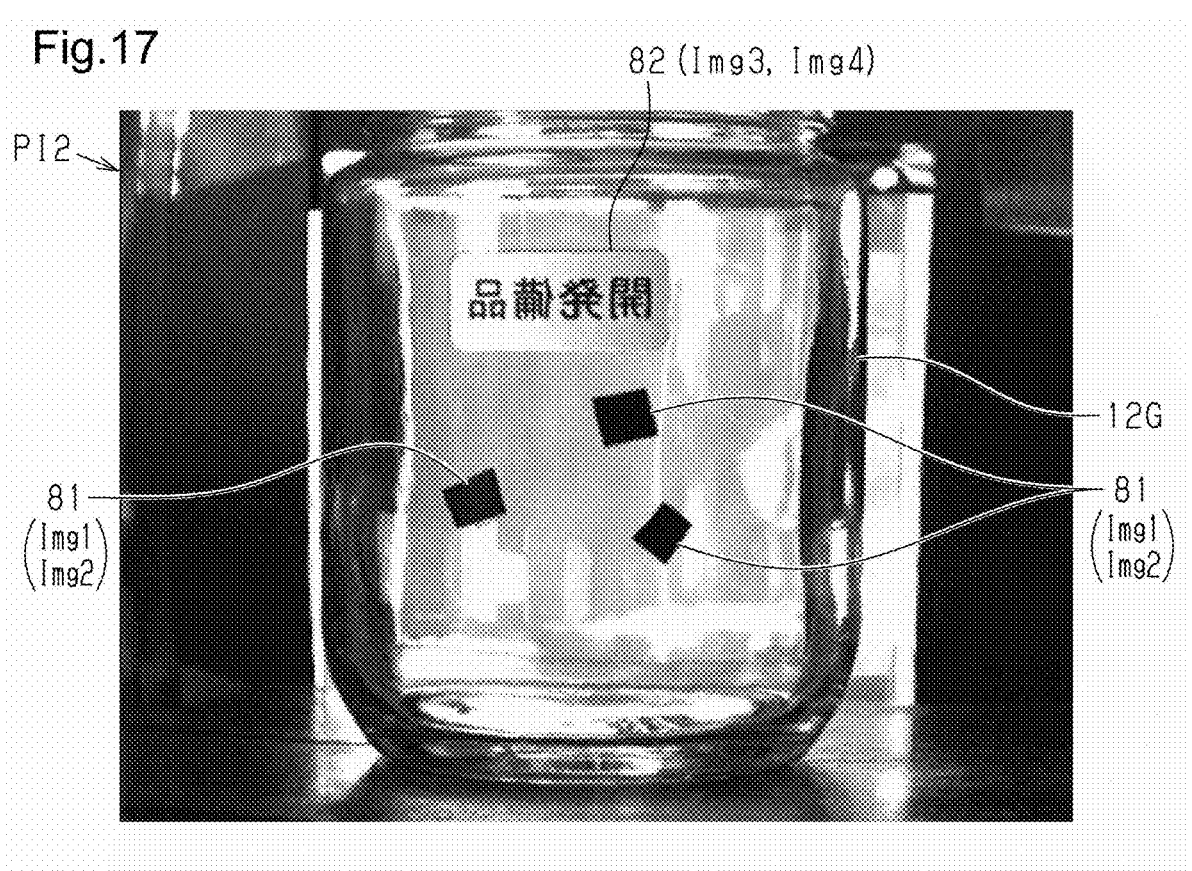
FIG. 17 is a diagram showing a captured picture of an example.

The imaging device 11 may be configured such that the cameras 31 to 34 do not include optical bandpass filters 35 and that the processing for separating visible light from near-infrared light (such as matrix operation) is not performed. Also, the camera 30 is not limited to a color camera, and may be a black and white camera. The imaging device 11 having such a configuration can still obtain pictures that facilitate the identification of defects such as foreign matter of the subject. Referring to FIGS. 16 and 17, examples of the pictures obtained by the imaging device 11 are now described. FIGS. 16 and 17 show pictures captured by a black and white camera that has sensitivity to visible light to near-infrared light. A comparative example is a conventional imaging device that includes four sets of a light source and a camera that are opposed with the subject interposed in between. An example is an imaging device 11 that does not include the optical bandpass filter 35 and does not perform separation processing (e.g., matrix operation) as described above. FIG. 16 shows a picture PI1 captured by the imaging device of the comparative example, and FIG. 17 shows a picture PI2 captured by the imaging device 11 of the example. The article 12G as the subject of the pictures is a container, for example.

In the captured picture PI1 of the comparative example shown in FIG. 16, the background on the back side appears through the transparent container as the article 12G, making it difficult to visually perceive the pattern on the surface of the container. Accordingly, it is difficult to detect defects 81 such as soil or foreign matter on the article 12G.

In contrast, in the captured picture PI2 shown in FIG. 17, the first half mirror 41, which is located behind the transparent container as the article 12G in the picture, serves as the background. The first half mirror 41 is attached to the emission diffusion panel 27 of the first light source 21, which emits diffused light. The first half mirror 41 serving as the background allows for capturing of a picture that facilitates the visual perception of the pattern on the surface of the container. This facilitates the detection of any defects 81 such as soil or foreign matter on the article 12G. In this manner, without performing processing to separate near-infrared light from visible light, the imaging device 11 including M (M=1, 2, . . . ) image capturing units 15 can obtain pictures of the subject that facilitate identification of defects such as foreign matter. The label 82 attached to the surface of the article 12G is captured as a reflection picture, and can be visually perceived in both the picture PI1 of the comparative example and the picture PI2 of the example. In the picture PI2 of the example, the image of the label 82 belongs to the third image Img3 or the fourth image Img4, which is a reflection image.

Advantageous Effects of Embodiment

The first embodiment described in detail above has the following advantageous effects.

(1) The imaging device 11 includes two cameras 31 and 32 that receive light transmitted through an article 12 as an example of a subject from opposite directions and capture two transmission images of the subject. The imaging device 11 includes the first light source 21, which emits light to be transmitted through the article 12 in the first direction D1, and the second light source 22, which emits light to be transmitted through the article 12 in the second direction D2 opposite to the first direction D1, the first camera 31, which captures a first image Img1 by receiving first transmitted light TL1 transmitted through the article 12 in the first direction D1, and the second camera 32, which captures a second image Img2 by receiving second transmitted light TL2 transmitted through the article 12 in the second direction D2. The imaging device 11 includes the first half mirror 41 and the second half mirror 42. The first half mirror 41 reflects the first transmitted light TL1 at an intermediate position on the optical path of the first transmitted light TL1 along an optical path toward the first camera 31 while the second light source 22 is turned off, and also permits transmission of light traveling from the second light source 22 toward the article 12 at an intermediate position on the optical path of the light. The second half mirror 42 reflects the second transmitted light TL2 at an intermediate position on the optical path of the second transmitted light TL2 along an optical path toward the second camera 32 while the first light source 21 is turned off, and also permits transmission of light traveling from the first light source 21 toward the article 12 at an intermediate position on the optical path of the light. According to this configuration, it is possible to capture two high-quality transmission images obtained from light transmitted through the article 12 from opposite directions with a reduced likelihood of the surroundings of the article 12 appearing in the images, for example.

(2) The imaging device 11 includes the control unit 51. The control unit 51 causes the first light source 21 and the second light source 22 to emit light at different emission times, and causes capturing of the first image Img1 by the first camera 31 and capturing of the second image Img2 by the second camera 32 to occur at different image capturing times corresponding to the emission times. According to this configuration, it is possible to avoid a situation where the quality of the captured picture is degraded by light from another light source.

(3) The imaging device 11 includes M image capturing units (where M is a natural number greater than 1) each including a first light source 21, a second light source 22, a first camera 31, a second camera 32, a first half mirror 41, and a second half mirror 42. The M image capturing units are arranged such that, when the first cameras 31 of the respective image capturing units capture images, the first optical axes from the article 12 to the first half mirrors 41 are at mutually different angles. The M image capturing units are configured to capture images of the article 12 from 2M different directions. According to this configuration, the article 12 can be imaged from 2M different directions. Since 2M is greater than 4, any position around the entire circumference of the article 12 is reliably imaged.

(4) The imaging device 11 further includes the third light source 25, which can apply light to the article 12. The first camera 31 receives light that has been applied to the article 12 from the third light source 25, reflected on the surface of the article 12, and then reflected on the first half mirror 41. The first camera 31 thus captures a third image Img3. The second camera 32 receives light that has been applied to the article 12 from the third light source 25, reflected on the surface of the article 12, and then reflected on the second half mirror 42. The second camera 32 thus captures a fourth image Img4. According to this configuration, a picture of the surface of the article 12 can be obtained in addition to a picture transmitted through the article 12.

(5) The first and second light sources 21 and 22 each have an emission diffusion panel 27. The first half mirror 41 is bonded to the emission diffusion panel 27 of the second light source 22, and the second half mirror 42 is bonded to the emission diffusion panel 27 of the first light source 21. According to this configuration, when the first light source 21 and the second light source 22 emit light, the first half mirror 41 and the second half mirror 42 cannot be used as mirrors, but can be used as light sources. When the first light source 21 and the second light source 22 are turned off, the first half mirror 41 and the second half mirror 42 can be used as mirrors. When the light source and the mirror function do not have to be used simultaneously, the light source and the half mirror can be integrated, increasing the degree of flexibility in the shape and installation of the light source with the half mirror function.

(6) The first and second light sources 21 and 22 are configured to emit near-infrared light. The third light source 25 is configured to emit visible light. The first half mirror 41 includes a visible light blocking member 45, which limits transmission of visible light, on the side of the first half mirror 41 on which the second light source 22 is located. The second half mirror 42 includes a visible light blocking member 45, which limits transmission of visible light, on the side of the second half mirror 42 on which the first light source 21 is located. According to this configuration, while the visible light reflected on the article 12 is reflected on the light reflection surface of the half mirror, the visible light blocking member 45 blocks the visible light directed from the light source toward the half mirror. This allows for a reflection image of the article 12 to be captured with high quality based on the visible light.

(7) The first and second light sources 21 and 22 are configured to emit near-infrared light. The first and second cameras 31 and 32 are N-band color cameras (where N is a natural number greater than or equal to 3) including image sensors 37 having sensitivity to the visible light region and the near-infrared region. The imaging device 11 includes optical bandpass filters 35, which are placed on the optical paths between the article 12 and the image sensors 37 of the first and second cameras 31 and 32, and the conversion unit 60. When an image capturing signal S1 is input from one of the first and second cameras 31 and 32, the conversion unit 60 separates this image capturing signal S1 into picture signals of N bands and performs a matrix operation on the separated picture signals of N bands to generate a first picture signal MS1 of P bands (where P is a natural number less than N) having spectral sensitivity to the near-infrared region, and a second picture signal MS2 of Q bands (where Q=N−P) having spectral sensitivity to the visible light region. When an image capturing signal S1 is input from the first camera 31, the conversion unit 60 generates, based on this image capturing signal S1, a first picture signal MS1 including a first image Img1 and a second picture signal MS2 including a third image Img3. When an image capturing signal S1 is input from the second camera 32, the conversion unit 60 generates, based on this image capturing signal S1, a first picture signal MS1 including a second image Img2 and a second picture signal MS2 including a fourth image Img4.

According to this configuration, a near-infrared transmission image and a visible light reflection image of the article 12 can be captured in one image capturing operation, and a near-infrared transmission picture and a visible light reflection picture of the article 12 can be obtained from one image capturing signal S1 obtained in the single image capturing operation.

(8) The inspection device 10 includes the imaging device 11 and the inspection processing unit 70, which inspects the article 12 based on multiple pictures captured by the first and second cameras 31 and 32 of the imaging device 11. According to this configuration, the article 12 can be inspected with high accuracy using the multiple transmission pictures obtained from light transmitted through the article 12 in opposite directions.

(9) The imaging method of capturing images of an article 12 using the imaging device 11 includes a first image capturing step, a second image capturing step, a first picture obtainment step, and a second picture obtainment step. In the first image capturing step, the first light source 21 emits light while the second light source 22 is turned off, and the first camera 31 captures a first image Img1 of the article 12. In the second image capturing step, the second light source 22 emits light while the first light source 21 is turned off, and the second camera 32 captures a second image Img2 of the article 12. In the first picture obtainment step, a first picture including the first image Img1 is obtained based on the image capturing signal S1 obtained from the first camera 31. In the second picture obtainment step, a second picture including the second image Img2 is obtained based on the image capturing signal S1 obtained from the second camera 32. According to this method, it is possible to capture two high-quality transmission images obtained from light transmitted through the article 12 from opposite directions with a reduced likelihood of the surroundings of the article 12 appearing in the images, for example, in the same manner as the imaging device 11.

Embodiments are not limited to the above, and may be modified as follows.

Figure 18:
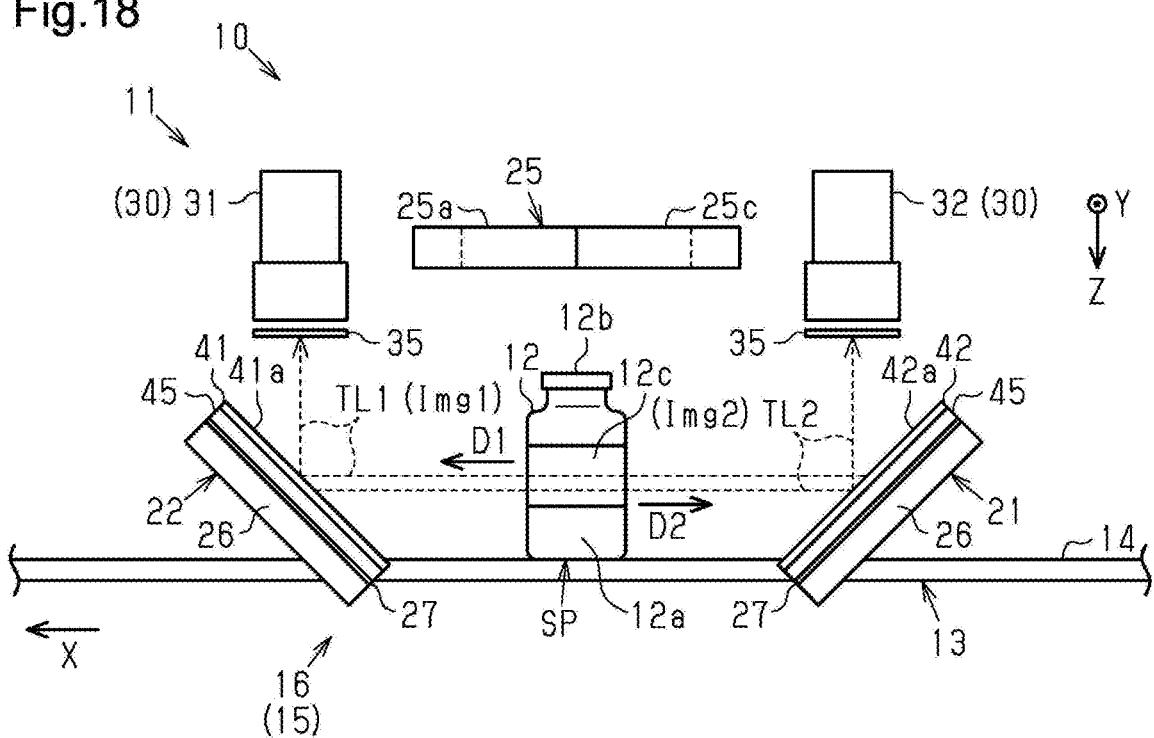
FIG. 18 is a side view showing a modification of an imaging device.

As shown in FIG. 18, the first and second cameras 31 and 32 may be arranged vertically so that their respective optical axes are parallel to the vertical direction Z. Also, one of the first and second cameras 31 and 32 may be arranged horizontally so that its optical axis is horizontal, and the other of the first and second cameras 31 and 32 may be arranged vertically as described above. Furthermore, an image capturing unit 15 including a horizontal camera 30 and an image capturing unit 15 including a vertical camera 30 may be used together.

The image capturing units 15 may differ in the angle between the first optical axis and the second optical axis, which extends from the article 12 to the second half mirror 42 in the image capturing by the second camera 32.

The image capturing units 15 may differ in the distance between the first camera 31 and the first half mirror 41 and the distance between the first half mirror 41 and the subject.

The entire-circumference inspection of the article 12 may be performed using one image capturing unit 15. That is, the entire circumference of the article 12 may be inspected based on two pictures (a front picture and a back picture) obtained by the cameras 31 and 32 capturing images of the front and back surfaces of the article 12. Inspection of the article 12 is not limited to the entire-circumference inspection. A configuration may also be adopted in which only a part in the circumferential direction of the outer circumference surface of the article 12 is inspected. The inspection processing unit 70 inspects the front and back surfaces of the article 12 based on two pictures of the front and back surfaces of the article 12.

The number of cameras 30 may be three. The two cameras 31 and 32 of the image capturing unit 15 and one camera 30 may be combined.

When a color camera including a color filter of primary colors is used, a color filter of four colors R, G1, G2, and B may be used. The color camera may have a complementary color filter, and the complementary colors may be four colors of yellow, cyan, magenta, and green.

When N colors are four colors, P=2, and Q=2, near-infrared picture signals of two channels may be generated based on the first picture signal of two bands, and pseudo-color picture signals of two channels may be generated based on the second picture signal of two bands.

Picture data (such as RGB picture data) based on the first image capturing signal S1 captured by the image sensor 37 through the optical bandpass filter 35 may be stored in a removable memory such as a USB memory. The picture data stored in the removable memory may be read by a personal computer, and the CPU (conversion unit 60) of the personal computer may perform conversion processing including matrix operation to generate multispectral pictures of multiple bands. That is, the device that performs the image capturing step and the device that performs the conversion step may be separate devices. Multispectral pictures of multiple bands may be obtained also by this imaging method.

The pictures output by the imaging device 11 may be visually inspected by an inspector.

The visible light blocking member 45 may be removed from the half mirror, visible light may be applied from the back side of the subject, and the transmission image of the visible light may be captured by the camera 30.

The number of colors of the color filter 38 of the image sensor 37 is not limited to three or four, and may be five or six. The filter of at least one of the colors may be a filter that blocks visible light and transmits non-visible light (NIR filter).

There is no limitation on the article 12, which is an example of a subject to be imaged or inspected. For example, the article 12 may be a container, such as a PET bottle or other bottles, food, beverage, electronic component, electric appliance, commodity, part, member, powder or liquid material, or the like.

The article 12 may be an empty container or a container containing one of liquid, solid, and gas having light transmissivity, for example. For example, it may be a container containing liquid. The article may be an ornament, a glass product, an acrylic product, an aquarium, tableware, a beaker, or an article containing transparent or translucent contents in a transparent or translucent bag. The article may also be food or processed food, such as jelly.

The imaging device 11 may be configured as a device separate from the inspection processing unit 70. The imaging device 11 may be used for purposes other than inspection.

The array pattern of the color filter 38 forming the image sensor 37 is not limited to the RGB Bayer array, and may be any array pattern such as a stripe array.

The imaging device 11 does not have to include the transport device 13. For example, an operator may place the subject on a mounting table for image capturing that serves as the image capturing position.

A part or whole of at least one of the control unit 51, the conversion unit 60, and the inspection processing unit 70 may be configured by computer software that executes a program, or may be configured by hardware such as an electronic circuit.

Each of the control processing unit 50, which includes the control unit 51, the conversion unit 60, and the signal processing unit 65, and the inspection processing unit 70 is not limited to a device that includes a CPU and a memory and executes software processing. That is, each of the control processing unit 50 and the inspection processing unit 70 may be processing circuitry that has any one of the following configurations (a) to (c).

(a) Processing circuitry including one or more processors that execute various processes according to computer programs. The processor includes a CPU and a memory such as RAM and ROM. The memory stores program codes or instructions configured to cause the CPU to execute processes. The memory, which is a computer-readable medium, includes any type of media that are accessible by general-purpose computers and dedicated computers.

(b) Processing circuitry including one or more dedicated hardware circuits that execute various processes. The dedicated hardware circuits include, for example, an application specific integrated circuit (ASIC).

(c) Processing circuitry including a processor that executes part of various processes according to programs and a dedicated hardware circuit that executes the remaining processes.

REFERENCE SIGNS LIST

10 . . . Inspection device; 11 . . . Imaging device; 12 . . . Article as example of subject; 12a . . . Container body; 12b . . . Lid; 12c . . . Label; 13 . . . Transport device; 14 . . . Conveyor; 15 . . . Image capturing unit; 16 . . . First image capturing unit; 17 . . . Second image capturing unit; 18 . . . Sensor; 21 . . . First light source; 22 . . . Second light source; 23 . . . First light source; 24 . . . Second light source; 25 . . . Third light source; 25a to 25d . . . Light emitting unit; 27 . . . Emission diffusion panel; 30 . . . Camera; 30a . . . Lens barrel; 31, 33 . . . First camera; 32. 34 . . . Second camera; 35 . . . Optical bandpass filter; 36 . . . Lens; 37 . . . Color image sensor (image sensor); 37R . . . R light receiving element; 37G . . . G light receiving element; 37B . . . B light receiving element; 38 . . . Color filter as example of spectral optical filter; 38R . . . R filter; 38G . . . G filter; 38B . . . B filter; 41, 43 . . . First half mirror; 42, 44 . . . Second half mirror; 45 . . . Visible light blocking member; 50 . . . Control processing unit; 51 . . . Control unit; 52 . . . Display unit; 60 . . . Conversion unit; 61 . . . RGB separation unit; 62 . . . XYZ conversion unit; 63 . . . Amplification unit; 65 . . . Signal processing unit; 70 . . . Inspection processing unit; 71 . . . Near-infrared inspection processing unit; 72 . . . Visible light detection processing unit; 73 . . . Combination inspection processing unit; 81 . . . Defect; 82 . . . Label; 201 . . . Infrared Near-infrared light blocking filter (IR blocking filter); TL1 . . . First transmitted light; TL2 . . . Second transmitted light; RL1 . . . Reflected light; RL2 . . . Reflected light; LS . . . Emission spectrum; S1 . . . First image capturing signal; S2 . . . Second image capturing signal; MS1 . . . First Picture Signal; MS2 . . . Second picture signal; IS1 . . . First Picture signal (first Picture); IS2 . . . Second picture signal (second Picture); VA . . . Visible light wavelength range; NIRA . . . Near-infrared wavelength range; D1 . . . First direction; D2 . . . Second direction; Img1 . . . First image (transmission image); Img2 . . . Second image (transmission image); Img3 . . . Third image (reflection image); Img4 . . . Fourth image (reflection image).

An imaging device (11) includes two cameras (31, 32) that capture transmission images of an article (12) from opposite directions, a first light source (21) that emits light that is transmitted through the article (12) in a first direction (D1), and a second light source (22) that emits light that is transmitted through the article (12) in a second direction (D2). The first camera (31) captures a first image that is a transmission image of the article (12). The second camera (32) captures a second image that is a transmission image of the article (12). The first half mirror (41) reflects first transmitted light toward the first camera (31) while the second light source (22) is turned off, and also permits transmission of light traveling from the second light source (22) toward the article (12). The second half mirror (42) reflects second transmitted light toward the second camera (32) while the first light source (21) is turned off, and also permits transmission of light traveling from the first light source (21) toward the article (12).

The invention claimed is:

1. An imaging device comprising two cameras that capture two transmission images of a subject by receiving light transmitted through the subject from opposite directions:

a first light source that emits light that is transmitted through the subject in a first direction;

a second light source that emits light that is transmitted through the subject in a second direction that is opposite to the first direction;

a first camera that is one of the two cameras and captures a first image by receiving first transmitted light transmitted through the subject in the first direction;

a second camera that is the other of the two cameras and captures a second image by receiving second transmitted light transmitted through the subject in the second direction;

a first half mirror that reflects the first transmitted light at an intermediate position on an optical path of the first transmitted light along an optical path toward the first camera while the second light source is turned off, and permits transmission of light traveling from the second light source toward the subject at an intermediate position on an optical path of the light; and a second half mirror that reflects the second transmitted light at an intermediate position on an optical path of the second transmitted light along an optical path toward the second camera while the first light source is turned off, and permits transmission of light traveling from the first light source toward the subject at an intermediate position on an optical path of the light, and a third light source capable of applying light to the subject, wherein the first camera captures a third image by receiving light that has been applied to the subject from the third light source, reflected on a surface of the subject, and then reflected on the first half mirror, and the second camera captures a fourth image by receiving light that has been applied to the subject from the third light source, reflected on a surface of the subject, and then reflected on the second half mirror.

2. The imaging device according to claim 1 further comprising a control unit, wherein the control unit causes the first light source and the second light source to emit light at different emission times, thus causing capturing of the first image by the first camera and capturing of the second image by the second camera to occur at different image capturing times corresponding to the emission times.

3. The imaging device according to claim 2 further comprising M image capturing units (where M is a natural number greater than or equal to 2) each including the first light source, the second light source, the first camera, the second camera, the first half mirror, and the second half mirror, wherein the M image capturing units are arranged such that first optical axes from the subject to the first half mirrors are at mutually different angles when the image capturing units capture images with the first cameras, and the M image capturing units are configured to image the subject from 2M different directions.

4. The imaging device according to claim 1, wherein the first light source and the second light source each include an emission diffusion panel, and the first half mirror is bonded to the emission diffusion panel of the second light source, and the second half mirror is bonded to the emission diffusion panel of the first light source.

5. The imaging device according to claim 1, wherein the first light source and the second light source are configured to emit near-infrared light, the third light source is configured to emit visible light, the first half mirror includes a visible light blocking member that limits transmission of visible light and is disposed on a side of the first half mirror on which the second light source is located, and the second half mirror includes a visible light blocking member that limits transmission of visible light and is disposed on a side of the second half mirror on which the first light source is located.

6. The imaging device according to claim 1, wherein the first light source and the second light source are configured to emit near-infrared light, the first camera and the second camera are N-band color cameras (where N is a natural number greater than or equal to 3) including image sensors having sensitivity to a visible light region and a near-infrared region, the imaging device further comprises:

optical bandpass filters respectively disposed on an optical path between the image sensor of the first camera and the subject and on an optical path between the image sensor of the second camera and the subject; and a conversion unit that, when receiving an image capturing signal from one of the first and second cameras, separates the image capturing signal into picture signals of N bands and performs a matrix operation on the separated picture signals of N bands to generate a first picture signal of P bands (where P is a natural number less than N) having spectral sensitivity to a near-infrared region, and a second picture signal of Q bands (where Q=N−P) having spectral sensitivity to a visible light region, and the conversion unit when receiving the image capturing signal from the first camera, generates the first picture signal including the first image and the second picture signal including the third image based on the image capturing signal, and when receiving the image capturing signal from the second camera, generates the first picture signal including the second image and the second picture signal including the fourth image based on the image capturing signal.

7. An inspection device comprising:

the imaging device according to claim 1; and an inspection processing unit that inspects the subject based on multiple pictures captured by the first camera and the second camera of the imaging device.

8. An imaging method for capturing images of the subject using the imaging device according to claim 1, the method comprising:

a first image capturing step in which the first camera captures the first image of the subject by causing the first light source to emit light while the second light source is turned off;

a second image capturing step in which the second camera captures the second image of the subject by causing the second light source to emit light while the first light source is turned off;

a first picture obtainment step of obtaining a first picture including the first image based on an image capturing signal obtained from the first camera; and a second picture obtainment step of obtaining a second picture including the second image based on an image capturing signal obtained from the second camera.

* * * * *